(12) United States Patent
Roizin et al.

(10) Patent No.: US 12,617,562 B2
(45) Date of Patent: May 5, 2026

(54) APPARATUS, SYSTEM, AND METHOD OF CHARGING A BATTERY OF AN AERIAL VEHICLE

(71) Applicant: TOWER SEMICONDUCTOR LTD., Migdal Haemek (IL)

(72) Inventors: Yakov Roizin, Afula (IL); Evgeny Pikhay, Haifa (IL); Niv Mizrahi, Kiryat Bialik (IL)

(73) Assignee: TOWER SEMICONDUCTOR LTD., Migdal Haemek (IL)

( * ) Notice: Subject to any disclaimer, the term of this patent is extended or adjusted under 35 U.S.C. 154(b) by 113 days.

(21) Appl. No.: 18/598,797

(22) Filed: Mar. 7, 2024

(65) Prior Publication Data

US 2025/0282503 A1 Sep. 11, 2025

(51) Int. Cl.
B64U 50/31 (2023.01)
B64U 101/00 (2023.01)
H02J 7/35 (2006.01)

(52) U.S. Cl.
CPC ................ B64U 50/31 (2023.01); H02J 7/35 (2013.01); B64U 2101/00 (2023.01)

(58) Field of Classification Search
CPC ........ B64U 50/31; B64U 2101/00; H02J 7/35
See application file for complete search history.

(56) References Cited

U.S. PATENT DOCUMENTS

| | | | |
|---|---|---|---|
| 10,009,119 B1 * | 6/2018 | Hiller | H04B 13/02 |
| 11,018,518 B2 | 5/2021 | Wang et al. | |
| 2023/0303267 A1 * | 9/2023 | Vidal Rojas | B60P 3/11 |

FOREIGN PATENT DOCUMENTS

| | | |
|---|---|---|
| CN | 112018831 A | 12/2020 |
| DE | 102012023719 B4 | 5/2023 |
| KR | 101887932 B1 | 8/2018 |

* cited by examiner

*Primary Examiner* — Michael C Zarroli
(74) *Attorney, Agent, or Firm* — Shichrur & Co.

(57) ABSTRACT

An apparatus may include a processor configured to process photodiode signal information, which corresponds to a plurality of photodiodes of an aerial vehicle, for example, to identify a plurality of electric currents, which may be generated by the plurality of photodiodes based on energy of a light beam to charge a battery of the aerial vehicle. The processor may be configured to determine a vehicle-position displacement to displace the aerial vehicle based on the plurality of electric currents. The vehicle-position displacement may be configured to adjust a photodiode-beam relative position of the plurality of photodiodes relative to the light beam. The apparatus may include an output to provide position displacement information based on the vehicle-position displacement.

25 Claims, 7 Drawing Sheets

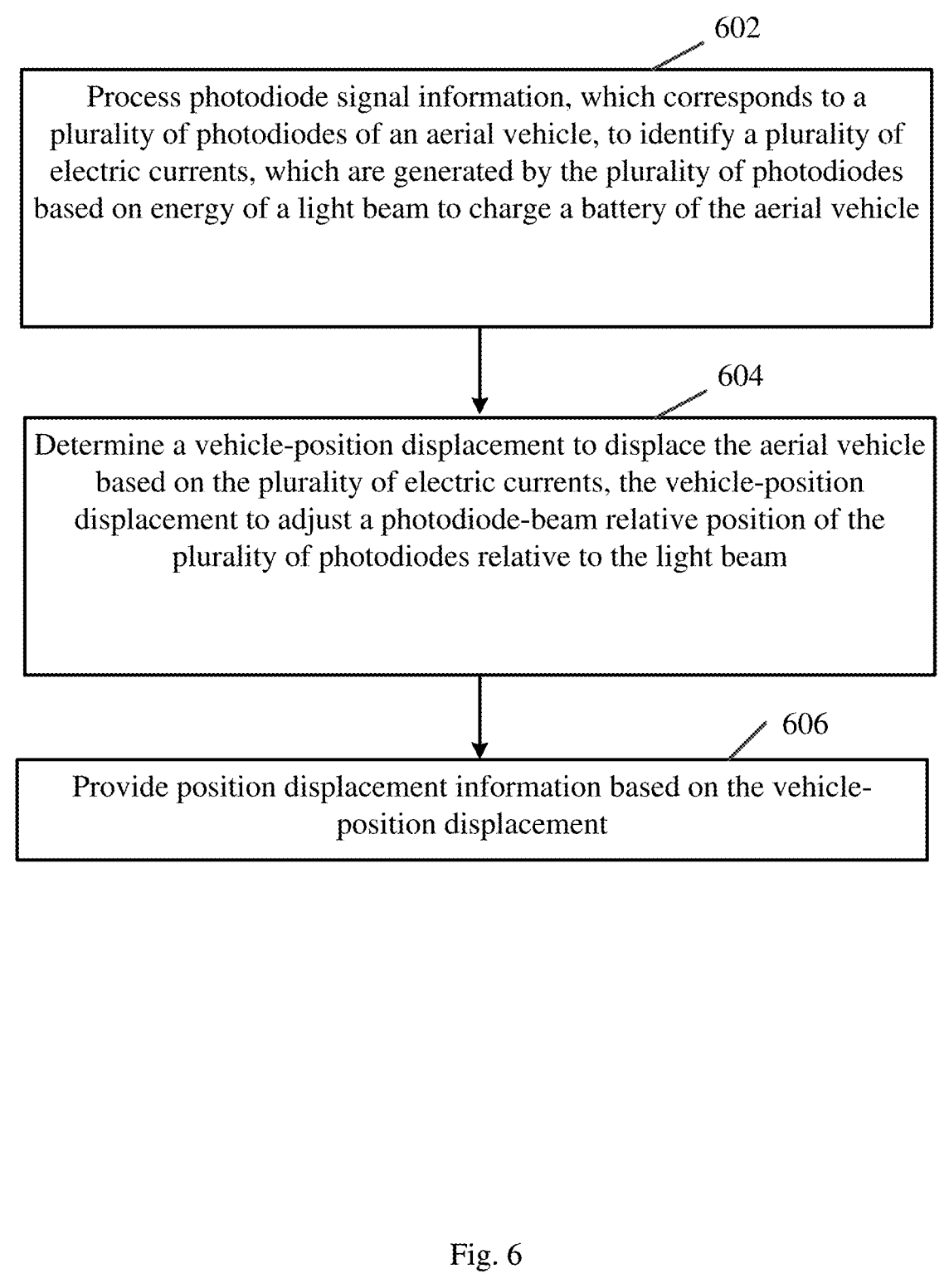

602

Process photodiode signal information, which corresponds to a plurality of photodiodes of an aerial vehicle, to identify a plurality of electric currents, which are generated by the plurality of photodiodes based on energy of a light beam to charge a battery of the aerial vehicle

604

Determine a vehicle-position displacement to displace the aerial vehicle based on the plurality of electric currents, the vehicle-position displacement to adjust a photodiode-beam relative position of the plurality of photodiodes relative to the light beam

606

Provide position displacement information based on the vehicle-position displacement

Fig. 6

APPARATUS, SYSTEM, AND METHOD OF CHARGING A BATTERY OF AN AERIAL VEHICLE

TECHNICAL FIELD

Aspects described herein generally relate to charging a battery of an aerial vehicle.

BACKGROUND

An aerial vehicle, e.g., a drone, may include a battery, which may be configured to provide electric power to the aerial vehicle.

Battery resources of the battery may be limited and, accordingly, it may be required to charge the battery of the aerial vehicle.

In some implementations, the battery of the aerial vehicle may be charged, for example, by connecting the aerial vehicle to a battery charger on the ground. However, this implementation may not be efficient, as it may require the aerial vehicle to land on the ground.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 6 is a schematic flow-chart illustration of a method of charging a battery of an aerial vehicle, in accordance with some demonstrative aspects.

DETAILED DESCRIPTION

Figure 1:
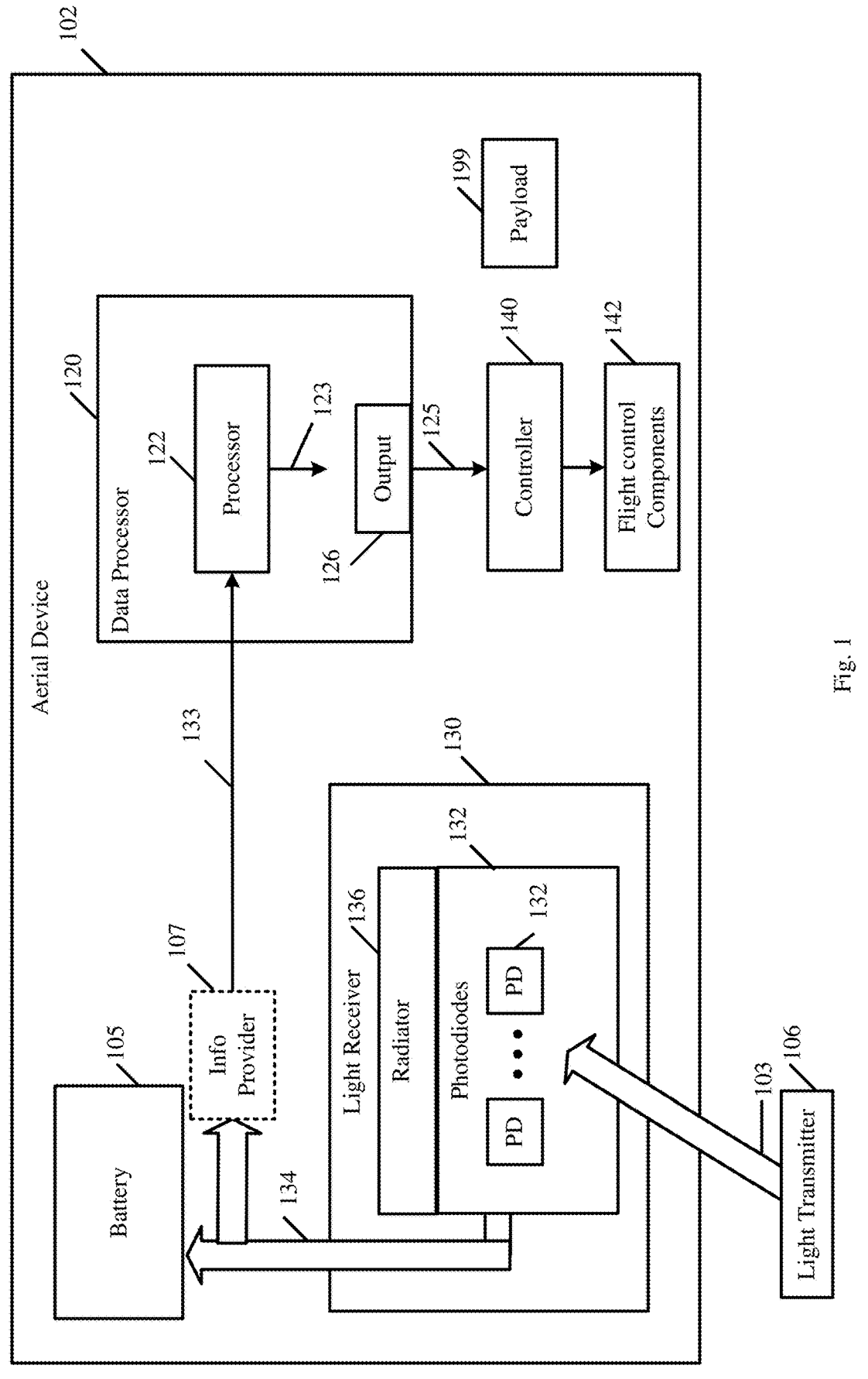
FIG. 1 is a schematic block diagram illustration of an aerial device, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

The terms "substrate" and/or "wafer", as used herein, may relate to a thin slice of semiconductor material, for example, a silicon crystal, which may be used in fabrication of integrated circuits and/or any other microelectronic devices. For example, the wafer may serve as the substrate for the microelectronic devices, which may be built in and over the wafer.

The term "Integrated Circuit" (IC), as used herein, may relate to a set of one or more electronic circuits on a semiconductor material. For example, an electronic circuit may include electronic components and their interconnectors.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

The term "circuitry", as used herein, may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, some functions associated with the circuitry may be implemented by one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

A "vehicle" may be understood to include any type of driven object. By way of example, a vehicle may be a driven object with a combustion engine, an electric engine, a reaction engine, an electrically driven object, a hybrid driven object, or a combination thereof.

An "aerial vehicle" may be understood to include any type of vehicle, which is configured to traverse within the air.

An "autonomous vehicle" may describe a vehicle capable of implementing at least one navigational change without a remote operator or a driver input. A navigational change may describe or include a change in one or more of an attitude, direction, orientation, steering, braking, acceleration/deceleration, or any other operation relating to movement, of the vehicle. A vehicle may be described as autonomous even in case the vehicle is not fully autonomous, for example, fully operational with or without a remote operator and/or a driver input. Autonomous vehicles may include those vehicles that can operate under remote operator control during certain time periods, and without remote operator control during other time periods. Additionally or alternatively, autonomous vehicles may include vehicles that control only some aspects of vehicle navigation, such as steering, e.g., to maintain a vehicle course, or some steering operations under certain circumstances, e.g., not under all circumstances, but may leave other aspects of vehicle navigation to the remote operator.

Reference is made to FIG. 1, which schematically illustrates a block diagram of an aerial vehicle 102, in accordance with some demonstrative aspects.

In some demonstrative aspects, aerial vehicle 102 may include a drone, a quadcopter, an Unmanned Aerial Vehicle (UAV), or any other type of aerial vehicle.

In some demonstrative aspects, the aerial vehicle 102 may be configured to perform one or more operations, for example, while traversing the air, e.g., including flying, hovering, image capturing functionalities, photography functionalities, security functionalities, surveillance functionalities, communication functionalities, military functionalities, and/or the like.

In some demonstrative aspects, aerial vehicle 102 may be configured to carry at least one payload 199, which may be configured to carry out one or more functionalities.

In one example, payload 199 may include an image-capturing device, e.g., a camera.

In another example, payload 199 may include one or more sensors, e.g., image sensors, heat sensors, and/or any other type of sensors.

In another example, payload 199 may include one or more communication devices, for example, transmitters, receivers, transceivers, routers, communication processors, or the like.

In another example, payload 199 may include one or more memories and/or storage devices, e.g., to store information processed by one or more other payloads.

In other aspects, payload 199 may include any other additional or alternative devices or systems.

In some demonstrative aspects, the aerial vehicle 102 may be configured to fly autonomously and/or to be piloted remotely, e.g., by a remote operator.

In some demonstrative aspects, the aerial vehicle may include a movement controller 140, which may be configured to control movement of the aerial vehicle 102.

In some demonstrative aspects, movement controller 140 may be configured to control one or more flight-control components and/or elements 142 of aerial vehicle 102, for example, to control the movement of the aerial vehicle 102.

In some demonstrative aspects, the one or more flight-control components 142 may include, for example, one or more motors, one or more engines, one or more wings, one or more rotors, one or more propellers, and/or any other suitable component and/or element, which may be utilized to control the movement of the aerial vehicle 102.

In some demonstrative aspects, aerial vehicle 102 may include a battery 105, which may be configured to provide electric power to components of the aerial vehicle 102, e.g., to an engine of the aerial vehicle 102, for example, to move the aerial vehicle 102.

In some demonstrative aspects, a capacity of the battery 105 may be limited, and charging the battery 102 may be required, for example, before resources of the battery 105 are exhausted.

In some demonstrative aspects, the battery 105 may be charged, for example, to allow the aerial vehicle 102 to continue to perform one or more activities.

In one example, in many use cases and/or implementations it may not be efficient to configure an aerial vehicle to be charged on the ground, e.g., by a battery charger. For example, an aerial vehicle configured for charging on the ground may have a limited operation time, and/or limited operation distance, which may result in limited utilization of the aerial vehicle.

In some demonstrative aspects, aerial vehicle 102 may be configured to implement one or more operations and/or functionalities of a wireless charging mechanism, which may be configured to provide a technical solution to support wireless charging of the remote aerial vehicle 102, e.g., as described below.

In some demonstrative aspects, aerial vehicle 102 may be configured to implement one or more operations and/or functionalities of a wireless charging mechanism, which may be configured to provide a technical solution to support wireless charging of the aerial vehicle 102, for example, while the aerial vehicle 102 is in the air, e.g., as described below.

In some demonstrative aspects, aerial vehicle 102 may be configured to implement one or more operations and/or functionalities of a wireless charging mechanism, which may be configured to provide a technical solution to support wireless charging of the aerial vehicle 102, for example, based on energy of a light beam 103, e.g., as described below.

In some demonstrative aspects, light beam 103 may be emitted, for example, from a light transmitter 106.

For example, light transmitter 106 may include a light source, e.g., a laser source, an Infra-Red (IR) light source, a Light Emitting Diode (LED), a power LED, a power IR LED, an array of LEDs, or the like.

For example, the light transmitter 106 may be located at a light transmission station (not shown in FIG. 1). For example, the light transmission station may be located on the ground, or at any other suitable location.

In some demonstrative aspects, aerial vehicle 102 may include a light receiver 130, which may be configured to harvest the energy of the light beam 103, which may be used, for example, to charge the battery 105, e.g., as described below.

In some demonstrative aspects, light receiver 130 may include one or more light-receiving and/or energy-collecting components, which may be configured to "harvest" energy from light beam 103, e.g., as described below.

In some demonstrative aspects, light receiver 130 may include an energy harvesting silicon chip, which may be configured to include energy collecting resources, e.g., a high-efficiency photovoltaic cell, which may be configured to collect energy from the light beam 103, e.g., as described below.

In some demonstrative aspects, light receiver 130 may be configured to implement an energy harvesting silicon chip including a plurality of photodiodes, e.g., in the form of silicon photovoltaic devices, to harvest energy from light beam 103, e.g., as described below.

For example, light receiver 130 may implement the silicon photovoltaic devices to provide a technical solution to support implementation of light receiver 130 with reduced cost, for example, compared to implementations using AIIIBV (A3B5) devices.

In some demonstrative aspects, as shown in FIG. 1, light receiver 130 may include a plurality of photodiodes 132 to harvest energy from the light beam 103, e.g., as described below.

In other aspects, light receiver 130 may be configured to include any other additional or alternative energy harvesting components and/or mechanisms, which may be configured to collect energy from the light beam 103.

In some demonstrative aspects, light receiver 130 may generate an electrical current to charge the battery 105, for example, based on the light beam 103.

In some demonstrative aspects, the level of the electrical current, which may be provided by the light receiver to charge the battery 105, may depend on a relative position between the light receiver 130 and the light beam 103, e.g., as described below.

For example, the level of the electrical current, which may be provided by the light receiver to charge the battery 105, may be affected by the flux of light from light beam 103 incident on the light receiver 130, e.g., as described below.

For example, the level of the electrical current, which may be provided by the light receiver to charge the battery 105, may be increased, for example, with an increase in the flux of light from light beam 103 incident on the light receiver 130, e.g., as described below.

For example, light receiver 130 may not be able to generate sufficient electrical current to properly charge the battery 105, for example, in case the flux of light from light beam 103 incident on the light receiver 130 is too low.

For example, the level of the electrical current, which may be provided by the light receiver to charge the battery 105, may be affected by an alignment between the light receiver 130 and the light beam 103, e.g., as described below.

For example, the level of the electrical current, which may be provided by the light receiver to charge the battery 105, may increase, for example, with the alignment between the light receiver 130 and the light beam 103, e.g., as described below.

For example, light receiver 130 may not be able to generate sufficient electrical current to properly charge the battery 105, for example, in case the light receiver 130 is not properly aligned with the light beam 103.

In some demonstrative aspects, in some use cases, scenarios, and/or implementations, there may be one or more technical inefficiencies, disadvantages and/or problems in implementing one or more techniques ("beam-direction adjusting techniques"), which may be configured to adjust a direction of a light beam for an aerial vehicle, e.g., at the light transmitter, for example, in order to align the light beam with a light receiver of the aerial vehicle.

For example, the beam-direction adjusting techniques may be complicated, may be affected by environmental conditions, e.g., weather conditions, may be inefficient, and/or may be hard to implement.

In one example, a ground tracking system may be configured to adjust a direction of the light beam to track the position of the aerial vehicle. For example, a camera may be implemented at a ground station to track the position of the aerial vehicle, for example, based on images of the aerial vehicle and/or reflections of the light beam, which may be captured by the camera. For example, the images captured by the camera may be used to track the aerial vehicle, and to adjust the direction of the light beam, e.g., to aim the light beam towards the aerial vehicle. For example, performance of such ground tracking system may be affected by environment conditions, e.g., weather conditions.

In another example, a ground tracking system may be configured to adjust the direction of the light beam, for example, based on feedback, e.g., a laser feedback or any other feedback, which may be communicated from the aerial vehicle to a station operating the light transmitter. For example, the feedback from the aerial vehicle may be configured to indicate a direction in which the light beam is to be directed from the station towards the aerial vehicle. For example, implementation of the feedback from the aerial vehicle to the station may require the use of a communication interface, e.g., a dedicated communication payload, which may add complexity and cost.

For example, implementation of the laser feedback may be subject to atmospheric turbulence, which may cause fluctuations of the laser feedback and, accordingly, may affect an accuracy of the laser feedback, which may lead to a degradation in the accuracy of the adjustment of the direction of the light beam.

In some demonstrative aspects, aerial vehicle 102 may be configured to implement one or more operations and/or functionalities of a wireless charging mechanism, which may be configured to provide a technical solution to support an alignment, e.g., an improved alignment, between light receiver 130 and light beam 103, for example, even without using a camera, a tracking device, a feedback, and/or any other beam-direction adjusting techniques, e.g., as described below.

In some demonstrative aspects, aerial vehicle 102 may be configured to implement one or more operations and/or functionalities of a wireless charging mechanism, which may be configured to provide a technical solution to support an alignment, e.g., an improved alignment, between light receiver 130 and light beam 103, for example, even without adjusting the direction of the light beam 103, e.g., as described below.

In some demonstrative aspects, aerial vehicle 102 may be configured to implement one or more operations and/or functionalities of a wireless charging mechanism, which may be configured to provide a technical solution to support an alignment, e.g., an improved alignment, between light receiver 130 and light beam 103, for example, by adjusting a position of the light receiver 130 relative to the light beam 103, e.g., as described below.

In some demonstrative aspects, aerial vehicle 102 may be configured to implement one or more operations and/or functionalities of a wireless charging mechanism, which may be configured to provide a technical solution to support an alignment, e.g., an improved alignment, between light receiver 130 and light beam 103, for example, by controlling a position of the aerial vehicle 102 relative to the light beam 103, e.g., as described below.

In some demonstrative aspects, aerial vehicle 102 may be configured to implement one or more operations and/or functionalities of a wireless charging mechanism, which may be configured to provide a technical solution to support an alignment, e.g., an improved alignment, between light receiver 130 and light beam 103, for example, by adjusting a position of the aerial vehicle 102 relative to the light beam 103, e.g., as described below.

In some demonstrative aspects, the wireless charging mechanism may be configured to provide a technical solution to substantially maintain alignment of one or more light-receiving and/or energy-collecting components of light receiver 130, e.g., energy collecting resources of an energy harvesting silicon chip of light receiver 130, with the light beam 103, e.g., as described below.

In some demonstrative aspects, aerial vehicle 102 may be configured to implement one or more operations and/or functionalities of a wireless charging mechanism, which may be configured to provide a technical solution to support the light-receiving and/or energy-collecting components of light receiver 130 in absorbing an increased quanta, e.g., a significant quanta, of the energy of light beam 103, e.g., as described below.

In some demonstrative aspects, aerial vehicle 102 may be configured to implement one or more operations and/or functionalities of a wireless charging mechanism, which may be configured to provide a technical solution to support the alignment between the light receiver 130 and the light beam 130, for example, by utilizing one or more high mobility attributes of the aerial vehicle 102.

For example, the wireless charging mechanism may be configured to utilize high mobility attributes of modern aerial vehicles, e.g., modern drones, for example, to move and/or displace the aerial vehicle 102, for example, in order to adjust a relative position of the light receiver 130 relative to the light beam 103, e.g., as described below.

In some demonstrative aspects, aerial vehicle 102 may include a data processor 120, which may be configured to control and/or adjust a relative position of the light receiver 130 relative to the light beam 103, for example, based on photodiode signal information 133 corresponding to the plurality of photodiodes 132 of light receiver 130, e.g., as described below.

In some demonstrative aspects, one or more components and/or functionalities of data processor 120 may be implemented as a dedicated and/or separate element of aerial device 102.

In other aspects, one or more components and/or functionalities of data processor 120 may be implemented as part of controller 140 and/or as part of any other suitable component and/or element of aerial device 102.

In some demonstrative aspects, data processor 120 may include a processor 122, which may be configured to process the photodiode signal information 133, e.g., as described below.

In some demonstrative aspects, processor 122 may include, or may be implemented, partially or entirely, by circuitry and/or logic, e.g., one or more processors including circuitry and/or logic, and/or memory circuitry and/or logic. For example, data processor 120 may include at least one memory (not shown in FIG. 1), e.g., coupled to the processor 122, for example, to store data processed by processor 122. For example, the memory may store, e.g., at least temporarily, at least some of the information processed by the processor 122, and/or logic to be utilized by the processor 122. Additionally or alternatively, one or more functionalities of processor 122 may be implemented by logic, which may be executed by a machine and/or one or more processors, e.g., as described below.

In other aspects, processor 122 may be implemented as part of any other, dedicated, or non-dedicated, element of aerial vehicle 102.

In some demonstrative aspects, processor 122 may be configured to process the photodiode signal information 133, for example, to identify a plurality of electric currents 134, which may be generated by the plurality of photodiodes 132, e.g., as described below.

In some demonstrative aspects, the plurality of electric currents 134 may be generated by the plurality of photodiodes 132, for example, based on energy of the light beam 103 to charge the battery 105 of the aerial vehicle 102, e.g., as described below.

In some demonstrative aspects, processor 122 may be configured to determine a vehicle-position displacement 123 to displace the aerial vehicle 102, for example, based on the plurality of electric currents 134, e.g., as described below.

In some demonstrative aspects, the vehicle-position displacement 123 may be configured to adjust a photodiode-beam relative position of the plurality of photodiodes 132 relative to the light beam 103, e.g., as described below.

In one example, the vehicle-position displacement 123 may be configured, for example, relative to a current position of the aerial vehicle 102.

In another example, the vehicle-position displacement 123 may be configured, for example, relative to a predefined position, e.g., a reference position, of the aerial vehicle 102.

In another example, the vehicle-position displacement 123 may be configured, for example, relative to a predefined location, e.g., a reference location.

In other aspects, the vehicle-position displacement 123 may be configured relative to any other position, location, and/or orientation.

In one example, the vehicle-position displacement 123 may include, for example, a linear displacement, e.g., a vertical displacement, and/or a horizontal displacement, for example, according to a linear coordinate system.

In another example, the vehicle-position displacement 123 may include, for example, an angular displacement, e.g., a yaw rotation, a pitch rotation, and/or a roll rotation, for example, according to an angular coordinate system.

In another example, the vehicle-position displacement 123 may include, for example, a combination of an angular displacement and a liner displacement.

In other aspects, the vehicle-position displacement 123 may include any other suitable displacement according to any other suitable coordinate system.

In some demonstrative aspects, data processor 120 may include an output 126, which may be configured to provide position displacement information 125, for example, based on the vehicle-position displacement 123, e.g., as described below.

In some demonstrative aspects, the position displacement information 125 may be provided to the controller 140, for example, to control displacement of the aerial vehicle 102, e.g., as described below.

In some demonstrative aspects, movement controller 140 may be configured to control movement of the aerial vehicle 102, for example, based on the position displacement information 125, e.g., as described below.

In some demonstrative aspects, the position displacement information 125 may be configured to include information suitable to indicate to controller that the aerial vehicle 102 is to be displaced according to the vehicle-position displacement 123, e.g., as described below.

In some demonstrative aspects, the position displacement information 125 may be configured according to a suitable format to request, instruct, trigger, cause, and/or control controller 140 to displace the aerial vehicle 102 according to the vehicle-position displacement 123, e.g., as described below.

In some demonstrative aspects, the position displacement information 125 may include, for example, the vehicle-position displacement 123, e.g., as described below.

In other aspects, the position displacement information 125 may include any other additional and/or alternative information, which may be based, partially or entirely, on the vehicle-position displacement 123.

In some demonstrative aspects, the photodiode signal information 133 may include a plurality of current magnitudes of the plurality of electric currents 134, e.g., as described below.

In other aspects, the photodiode signal information 133 may include any other additional and/or alternative information based on the plurality of electric currents 134.

In some demonstrative aspects, processor 122 may be configured to receive the plurality of electric currents 134, and to determine the photodiode signal information 133, for example, based on the plurality of electric currents 134.

For example, processor 122 may be configured to process the plurality of electric currents 134, for example, to determine the plurality of current magnitudes of the plurality of electric currents 134.

In some demonstrative aspects, processor 122 may be configured to receive the photodiode signal information 133, for example, from a photodiode signal information provider 107, which may be implemented by any other suitable element, device, and/or component of aerial device 102.

In some demonstrative aspects, the signal information provider 107 may be configured to determine the photodiode signal information 133, for example, based on the plurality of electric currents 134, and to provide the photodiode signal information 133, for example, to processor 122.

In some demonstrative aspects, the signal information provider 107 may be configured to determine the plurality of current magnitudes of the plurality of electric currents 134, for example, based on the plurality of electric currents 134, and to provide the photodiode signal information 133 including the current magnitudes of the plurality of electric currents 134, for example, to processor 122.

In some demonstrative aspects, the signal information provider 107 may include a current meter, which may be configured to measure the plurality of current magnitudes of the plurality of electric currents 134.

For example, the current meter may include current measurement circuitry, a current detector, a current sensor, and/or the like.

In some demonstrative aspects, the signal information provider 107 may include a processor, which may be configured to generate the photodiode signal information 133, for example, including the plurality of current magnitudes of the plurality of electric currents 134.

For example, the processor of signal information provider 107 may be configured to determine the plurality of current magnitudes of the plurality of electric currents 134, and to provide the photodiode signal information 133 including the plurality of current magnitudes, e.g., to processor 122.

In one example, the processor of signal information provider 107 may be configured to determine the photodiode signal information 133, for example, based directly on the plurality of electric currents 134.

In another example, the processor signal information provider 107 may be configured to determine the photodiode signal information 133, for example, based on information from another device, e.g., from the current meter.

In some demonstrative aspects, processor 122 may be configured to determine the photodiode signal information 133, for example, based on information from signal information provider 107, which may be based on the plurality of electric currents 134. For example, the information from signal information provider 107 may include voltage information, power information, and/or any other information, which may be used to determine the photodiode signal information 133.

In some demonstrative aspects, processor 122 may be configured to determine the vehicle-position displacement 123, for example, based on a real-time levels of, and/or real-time changes in, the levels the electric currents 134 corresponding to the plurality of photodiodes 132, e.g., as described below.

In some demonstrative aspects, processor 122 may be configured to determine a first vehicle-position displacement 123, for example, based on a first plurality of electric currents 134 corresponding to the plurality of photodiodes 132, e.g., as described below.

In some demonstrative aspects, processor 122 may be configured to determine a second vehicle-position displacement 123, for example, based on a second plurality of electric currents 134 corresponding to the plurality of photodiodes 132, e.g., as described below.

In some demonstrative aspects, the second plurality of electric currents 134 may be different from the first plurality of electric currents 134, e.g., as described below.

In some demonstrative aspects, the second vehicle-position displacement 123 may be different from the first vehicle-position displacement 123, e.g., as described below.

In some demonstrative aspects, processor 122 may be configured to determine the vehicle-position displacement 123, for example, based on a mapping between the plurality of electric currents 134 and a plurality of photodiode positions of the plurality of photodiodes 132, e.g., as described below.

In some demonstrative aspects, processor 122 may be configured to determine the vehicle-position displacement 123, for example, based on a geometrical arrangement of the plurality of photodiode positions, e.g., as described below.

In some demonstrative aspects, processor 122 may be configured to determine the vehicle-position displacement 123, for example, based on a distribution of magnitudes of the plurality of electric currents 134, e.g., as described below.

In other aspects, processor 122 may be configured to determine the vehicle-position displacement 123, for example, based on any other additional or alternative parameter or attribute of the plurality of electric currents 134.

In some demonstrative aspects, processor 122 may be configured to determine the vehicle-position displacement 123, for example, based on a comparison between magnitudes of two or more of the plurality of electric currents 134, e.g., as described below.

In other aspects, processor 122 may be configured to determine the vehicle-position displacement 123, for example, based on a comparison between any other attribute and/or parameter corresponding to the plurality of electric currents 134, e.g., as described below.

In some demonstrative aspects, processor 122 may be configured to determine the vehicle-position displacement 123, for example, based on a difference between a first electric current magnitude mapped to a first photodiode position, e.g., of a first photodiode 132, and a second electric current magnitude mapped to a second photodiode position, e.g., of a second photodiode 132, e.g., as described below.

In some demonstrative aspects, processor 122 may be configured to determine the vehicle-position displacement 123, for example, based on a displacement between the first photodiode position and the second photodiode position, e.g., as described below.

In some demonstrative aspects, processor 122 may be configured to determine the vehicle-position displacement 123, for example, based on the difference between the first electric current magnitude and the second electric current magnitude, and based on a displacement between the first photodiode position and the second photodiode position, e.g., as described below.

In some demonstrative aspects, processor 122 may be configured to determine a magnitude of the vehicle-position displacement 123, for example, based on the difference between the first electric current magnitude and the second electric current magnitude, e.g., as described below.

In other aspects, processor 122 may be configured to determine the magnitude of the vehicle-position displacement 123 based on any other additional and/or alternative function and/or calculation applied to the first electric current magnitude and/or the second electric current magnitude.

In some demonstrative aspects, processor 122 may be configured to determine a direction of the vehicle-position displacement 123, for example, based on the displacement between the first photodiode position and the second photodiode position, e.g., as described below.

In some demonstrative aspects, processor 122 may be configured to determine the direction of the vehicle-position displacement 123, for example, based on sign of the difference between the first electric current magnitude and the second electric current magnitude, e.g., as described below.

In other aspects, processor 122 may be configured to determine the direction of the vehicle-position displacement 123 based on any other additional and/or alternative calculation and/or function applied to the first electric current magnitude and/or the second electric current magnitude.

In some demonstrative aspects, processor 122 may be configured to determine the vehicle-position displacement 123, for example, based on a real-time values of, and/or real-time changes in, the difference between the first electric current magnitude mapped to the first photodiode position and the second electric current magnitude mapped to the photodiode position, e.g., as described below.

In some demonstrative aspects, processor 122 may be configured to determine a first vehicle-position displacement 123, for example, based on a first difference between the first electric current magnitude mapped to the first photodiode position and the second electric current magnitude mapped to the photodiode position, e.g., as described below.

In some demonstrative aspects, processor 122 may be configured to determine a second vehicle-position displacement 123, for example, based on a second difference between the first electric current magnitude mapped to the first photodiode position and the second electric current magnitude mapped to the photodiode position, e.g., as described below.

In some demonstrative aspects, the first difference between the electric current magnitudes may be different from the second difference between the electric current magnitudes, e.g., as described below.

In some demonstrative aspects, the second vehicle-position displacement 123, which is based on the second difference between the electric current magnitudes, may be different from the first vehicle-position displacement 123, which is based on the first difference between the electric current magnitudes, e.g., as described below.

In some demonstrative aspects, processor 122 may be configured to determine a photodiode-beam relative position adjustment to adjust the photodiode-beam relative position of the plurality of photodiodes 132 relative to the light beam 103, e.g., as described below.

In some demonstrative aspects, processor 122 may be configured to determine the photodiode-beam relative position adjustment, for example, to adjust the photodiode-beam relative position of the plurality of photodiodes 132 relative to the light beam 103, for example, based on the mapping between the plurality of electric currents 134 and the plurality of photodiode positions, e.g., as described below.

In some demonstrative aspects, processor 122 may be configured to determine the vehicle-position displacement 123, for example, based on the photodiode-beam relative position adjustment, e.g., as described below.

In other aspects, processor 122 may be configured to determine the vehicle-position displacement 123, for example, based on any other additional or alternative criteria relating to the plurality of electric currents 134, the plurality of photodiode positions of the plurality of photodiodes 132, and/or any other suitable additional or alternative information.

In some demonstrative aspects, processor 122 may be configured to determine the vehicle-position displacement 123, for example, based on a target charging current of the battery 105, e.g., as described below.

In some demonstrative aspects, processor 122 may be configured to determine a first vehicle-position displacement 123, for example, based on a first target charging current, e.g., as described below.

In some demonstrative aspects, processor 122 may be configured to determine a second vehicle-position displacement 123, for example, based on a second target charging current, e.g., as described below.

In some demonstrative aspects, the second target charging current may be different from the first target charging current, e.g., as described below.

In some demonstrative aspects, the second vehicle-position displacement 123 may be different from the first vehicle-position displacement 123, e.g., as described below.

In some demonstrative aspects, processor 122 may be configured to determine the vehicle-position displacement 123, for example, based on the target charging current of the battery 105 and a total current of the plurality of electric currents 134, e.g., as described below.

In some demonstrative aspects, processor 122 may be configured to determine the vehicle-position displacement 123, for example, based on a comparison between the total current of the plurality of electric currents 134 and the target charging current of the battery 105, e.g., as described below.

In other aspects, processor 122 may be configured to determine the vehicle-position displacement 123 based on any other additional and/or alternative function and/or calculation applied to the plurality of electric currents 134 and/or the target charging current of the battery 105.

In some demonstrative aspects, processor 122 may be configured to determine the vehicle-position displacement 123, for example, to increase the total current of the plurality of electric currents 134, for example, based on a determination that the total current is lower than the target charging current, e.g., as described below.

In some demonstrative aspects, processor 122 may be configured to determine the vehicle-position displacement 123, for example, to reduce the total current of the plurality of electric currents 134, for example, based on a determination that the total current is higher than the target charging current, e.g., as described below.

In some demonstrative aspects, processor 122 may be configured to determine the target charging current according to a charging profile to charge the battery 105, for example, based on a State Of Charge (SOC) of the battery 105, e.g., as described below.

In other aspects, processor 122 may be configured to determine the target charging current according to the charging profile to charge the battery 105 based on any other additional or alternative criteria.

In some demonstrative aspects, the target charging current may include a maximal current, e.g., as described below.

In other aspects, the target charging current may include any other suitable current.

In some demonstrative aspects, processor 122 may be configured to determine the vehicle-position displacement 123 to adjust the photodiode-beam relative position such that the light beam 103 substantially equally illuminates the plurality of photodiodes 132, e.g., as described below.

In some demonstrative aspects, processor 122 may be configured to determine the vehicle-position displacement 123 to adjust the photodiode-beam relative position such that the light beam 103 substantially equally illuminates the plurality of photodiodes 132, for example, based on a determination that the target charging current includes the maximal current, e.g., as described below.

In some demonstrative aspects, the light receiver 130 may be configured to harvest the energy of the light beam 103 including a Near Infra-Red (NIR) light beam 103, e.g., as described below.

In some demonstrative aspects, the light receiver 130 may be configured to harvest the energy of the light beam 103 including a Neodymium-Doped Yttrium Aluminum Garnet (ND:YAG) light beam 103, e.g., as described below.

In other aspects, the light receiver 130 may be configured to harvest the energy of the light beam 103 including any other type of light beam.

In some demonstrative aspects, the light receiver 130 may be configured to harvest the energy of the light beam 103 having a wavelength of, for example, between 0.9 micrometer (um) and 1.1 (um), e.g., as described below.

In some demonstrative aspects, the light receiver 130 may be configured to harvest the energy of the light beam 103 having a wavelength of, for example, between 1 um and 1.08 um, e.g., as described below.

In some demonstrative aspects, the light receiver 130 may be configured to harvest the energy of the light beam 103 having a wavelength of, for example, between 1.05 um and 1.07 um, e.g., as described below.

In some demonstrative aspects, the light receiver 130 may be configured to harvest the energy of the light beam 103 having a wavelength of, for example, substantially about 1.06 um, e.g., as described below.

In other aspects, the light receiver 130 may be configured to harvest the energy of the light beam 103 having any other suitable wavelength.

In one example, the light receiver 130 may be configured to harvest the energy of the light beam 103 including an ND:YAG light beam 103 having a wavelength of about 1.06 micrometer.

In some demonstrative aspects, the plurality of photodiodes 132 may include at least three photodiodes, e.g., as described below.

In some demonstrative aspects, the plurality of photodiodes 132 may include at least four photodiodes, e.g., as described below.

In other aspects, the plurality of photodiodes 132 may include any other count of photodiodes.

In some demonstrative aspects, the light receiver 130 may include a light receiver Silicon Integrated Circuit (SIC) 130, which may be configured to harvest the energy of the light beam 103, e.g., as described below.

In some demonstrative aspects, the light receiver SIC 130 may include the plurality of photodiodes 132, e.g., as described below.

In some demonstrative aspects, the plurality of photodiodes 132 may be implemented on a same silicon chip, e.g., on the light receiver SIC 130.

In some demonstrative aspects, the plurality of photodiodes 132 may be configured, for example, to have substantially a similar or same design and/or functionality of photovoltaic diodes.

In some demonstrative aspects, a width of the light receiver SIC 130 may be based, for example, on a two-sigma intensity distribution of the light beam 103, e.g., as described below.

In other aspects, light receiver SIC 130 may have any other dimensions, which may be based on any other additional and/or alternative, parameter, criterion, and/or attribute of the light beam 103.

In some demonstrative aspects, light receiver SIC 130 may include a quadrant light receiver SIC, for example, including four photodiodes 132, e.g., as described below.

In some demonstrative aspects, the four photodiodes 132 may be arranged in a 2×2 matrix, e.g., as described below.

In other aspects, light receiver SIC 130 may include any other count of photodiodes 132, which may be arranged in any other geometrical arrangement.

In some demonstrative aspects, aerial vehicle 102 may include a radiator 136, which may be attached to the plurality of photodiodes 132, e.g., as described below.

In one example, radiator 136 may be attached to the plurality of photodiodes 132, for example, to provide a technical solution to cool the light receiver SIC 130, e.g., as described below.

In some demonstrative aspects, at least one photodiode 132, e.g., one, some or all, of the plurality of photo diodes 132, may be coated with an Anti-Reflective Coating (ARC), e.g., as described below.

In other aspects, at least one photodiode 132, e.g., one, some, or all, of the plurality of photo diodes 132, may be coated with any other additional and/or alternative type of coating.

In some demonstrative aspects, at least one photodiode 132, e.g., one, some or all, of the plurality of photo diodes 132, may include a Float Zone Silicon photodiode, e.g., as described below.

In one example, at least one photodiode 132, e.g., one, some or all, of the plurality of photo diodes 132 may include a Float Zone Silicon photodiode coated with ARC.

In some demonstrative aspects, at least one photodiode 132, e.g., one, some or all, of the plurality of photo diodes 132, may include a black-silicon patterned surface photodiode, e.g., as described below.

In one example, at least one photodiode 132, e.g., one, some or all, of the plurality of photo diodes 132 may include a Float Zone Silicon photodiode including a black-silicon patterned surface, for example, to provide a technical solution to reduce, e.g., minimize, light reflections from the photodiode 132.

In some demonstrative aspects, at least one photodiode 132, e.g., one, some or all, of the plurality of photo diodes 132, may include a P-type plus (P+)–N-type minus (N—) (P+—N–) photodiode, e.g., as described below.

In some demonstrative aspects, at least one photodiode 132, e.g., one, some or all, of the plurality of photo diodes

132, may include an N-type plus (N+) P-type minus (P–) (N+—P–) photodiode, e.g., as described below.

In other aspects, at least one photodiode 132, e.g., one, some, or all, of the plurality of photo diodes 132, may include any other type of photodiode.

In some demonstrative aspects, at least one photodiode 132, e.g., one, some or all, of the plurality of photo diodes 132, may be configured to provide a Quantum Efficiency (QE) of at least 45 percent, e.g., as described below.

In some demonstrative aspects, at least one photodiode 132, e.g., one, some or all, of the plurality of photo diodes 132, may be configured to provide a QE of at least 60 percent, e.g., as described below.

In some demonstrative aspects, at least one photodiode 132, e.g., one, some or all, of the plurality of photo diodes 132, may be configured to provide a QE of at least 70 percent, e.g., as described below.

In some demonstrative aspects, at least one photodiode 132, e.g., one, some or all, of the plurality of photo diodes 132, may be configured to provide a QE of at least 73 percent, e.g., as described below.

In some demonstrative aspects, at least one photodiode 132, e.g., one, some or all, of the plurality of photo diodes 132, may be configured to provide a QE of at least 75 percent, e.g., as described below.

In other aspects, at least one photodiode 132, e.g., one, some or all, of the plurality of photo diodes 132, may be configured to provide any other QE.

In some demonstrative aspects, the plurality of photodiodes 132 may be fabricated, for example, on a high resistivity silicon, e.g., having a resistivity of about 10 kilo ohms per centimeter (kΩ*cm).

For example, the plurality of photodiodes 132 may be configured to provide a relatively high QE, for example, a QE of about 48%, e.g., based on testing of the plurality of photodiodes 132 with IR light.

In some demonstrative aspects, one or more silicon interface modifications may be implemented, for example, to enhance the QE of one or more of the plurality of photodiodes 132, e.g., to a QE of about 75% or more.

In some demonstrative aspects, the plurality of photodiodes 132 may be configured to provide a technical solution to support efficient energy harvesting of the energy of the light beam 103, for example, to charge the battery 105.

In one example, at least one photodiode 132, e.g., one, some or all, of the plurality of photo diodes 132, may be configured to provide a QE of at least 45 percent, for example, for light of at least a wavelength, denoted λ, of about 1.06 um, e.g., λ=1060 nanometer [nm].

In one example, the at least one photodiode 132 may be configured to provide the QE of at least 45 percent, for example, for light transmitted by a light transmitter, e.g., light transmitter 106, with at least a power density, denoted P, of about 763 Watt (W) per square meter (m²), e.g., $$P_{LED,measured} = 763.9 \left[ \frac{W}{m^2} \right].$$

In one example, the at least one photodiode 132 may be configured to provide the QE of at least 45 percent, for example, based on a photodiode effective area, denoted $A_{eff}$, of about 6 square millimeters, e.g., $A_{eff}$=6 [mm²].

In one example, the effective area $A_{eff}$ of a photodiode, e.g., a photodiode 132, may be defined, for example, based on an area of the photodiode, which is not covered by metal.

For example, the effective area $A_{eff}$ may include an open area, e.g., of light receiver 130, which enables incident light of light beam 130 to reach to the silicon of light receiver 130.

In one example, the at least one photodiode 132 may be configured to provide the QE of at least 45 percent, for example, with a photocurrent, denoted I, of about 1.88 milli-Ampere (mA) at a zero voltage, e.g., I (@ Vp=0 [V])=1.88 mA.

In one example, the at least one photodiode 132 may be configured to provide the QE of at least 45 percent, for example, with a current density, denoted J, of about 312 ampere per meter squared, e.g., $$J = 312\left[\frac{A}{m^2}\right].$$

For example, the current density J may be based on a quotient of division of the photocurrent I of the photodiode 132 at the zero voltage, divided by the effective area $A_{eff}$ of the photodiode 132.

For example, the QE, denoted $QE_\lambda$, of the photodiode 132 for the light beam having the wavelength $\lambda$ of about 1.06 micrometer may be determined, e.g., as follows:

$$QE_\lambda = \frac{R_\lambda}{\lambda} \cdot \frac{hc}{e} \cong \frac{R_\lambda}{\lambda} \cdot \left(\left[W \cdot \frac{nm}{A}\right]\right) = 47.7\%$$

wherein $$R_\lambda = \frac{J\left[\frac{A}{m^2}\right]}{P\left[\frac{W}{m^2}\right]} = 0.408\left[\frac{A}{W}\right],$$

h denotes the Planck constant, c denotes the speed of light in vacuum, and e denotes the elementary charge.

In some demonstrative aspects, processor 122 may be configured to utilize signal information of current signals from the energy harvesting chip of aerial vehicle 102, e.g., the photodiode signal information 133 corresponding to the plurality of currents 134, for example, to determine the vehicle-position displacement 123 of the aerial vehicle 102, e.g., as described above.

In some demonstrative aspects, processor 122 may be configured to utilize the signal information of current signals from the energy harvesting chip of aerial vehicle 102, for example, to determine the vehicle-position displacement 123 of the aerial vehicle 102, for example, with respect to an actual position of the aerial vehicle 102, and/or an intensity of the light beam 103, e.g., as described above.

In some demonstrative aspects, aerial vehicle 102 may be configured to provide a technical solution to support efficient charging of battery 105, for example, by taking advantage of efficient photo conversion properties of light receiver 130. For example, light receiver 130 may be configured to provide efficient photo conversion, for example, at least with respect to light beam 103 having a wavelength of about 1.06 um, and the plurality of photodiodes 132, which may be built on a Float Zone silicon having a high resistivity silicon, e.g., of 10 kΩ*cm, as described above.

For example, a photodiode 132, e.g., each photodiode 132, of the plurality of photo diodes 132, may be configured to provide a QE, which may exceed about ~75%, e.g., with ARC, and/or a QE, which may exceed about 49%, e.g., without ARC.

In some demonstrative aspects, aerial vehicle 102 may be configured to provide a technical solution to support dual-utilization of the plurality of electric currents 134 from the plurality of photodiodes 132, e.g., as described above.

In some demonstrative aspects, aerial vehicle 102 may be configured to utilize the plurality of electric currents 134 from the plurality of photodiodes 132, for example, for energy harvesting, e.g., to charge the battery 105.

In some demonstrative aspects, aerial vehicle 102 may be configured to utilize the plurality of electric currents 134 from the plurality of photodiodes 132, for example, to position and/or displace the aerial device 102, e.g., for adjusting the photodiode-beam relative position, for example, while utilizing the plurality of electric currents for energy harvesting, e.g., to charge the battery 105.

In some demonstrative aspects, processor 122 may be configured to analyze the photodiode signal information 133 corresponding to the plurality of photodiodes 132, for example, in order to generate the position displacement information 125, which may be configured, for example, to include movement commands to for controller 140 to control the one or more flight-control components 142, e.g., drone motors and/or the like, as described above.

In some demonstrative aspects, processor 122 may be configured to generate the position displacement information 125 to include movement commands to the controller 140, for example, to cause the one or more flight-control components 142 to adjust the photodiode-beam relative position of the plurality of photodiodes 132 relative to the light beam 132, for example, based on one or more considerations, e.g., as described above.

In some demonstrative aspects, processor 122 may be configured to generate the position displacement information 125 to include the movement commands to adjust the photodiode-beam relative position of the plurality of photodiodes 132 relative to the light beam 132, for example, according to a target charging current, e.g., as described above.

In one example, the target charging current may be configured, for example, to support a fast charging of the battery 105, e.g., as described above.

In another example, the target charging current may be configured, for example, to support an adapted charging profile. In one example, the adapted charging profile may be configured to focus on battery life saving, and/or on any other additional or alternative criteria and/or target.

In some demonstrative aspects, processor 122 may be configured to generate the position displacement information 125 to include the movement commands to position aerial device 102 at a predefined charging location to charge the battery 105, for example, based on a determination that a battery level of battery 105 is below a predefined threshold.

In one example, the predefined charging location may be associated with a light transmitter, for example, from a plurality of light transmitters in a plurality of light transmission stations.

In one example, aerial vehicle 102 may be configured to communicate, for example, with one or more light transmission stations, for example, to determine a predefined charging location corresponding to a selected light transmission station.

In one example, aerial vehicle 102 may be configured to navigate to the predefined charging location, for example, using a navigation system of the aerial vehicle 10.

In some demonstrative aspects, light transmitter 106 may be configured, for example, to start emitting the light beam 103 for use by aerial device 102, for example, based on an indication from aerial vehicle 102 and/or based on any other indication and/or determination, that the aerial vehicle 102 is at the predefined charging location corresponding to the light transmitter 106.

In some demonstrative aspects, light transmitter 106 may be configured, for example, to stop emitting the light beam 103 for use by aerial device 102, for example, based on an indication from aerial vehicle 102 and/or based on any other indication and/or determination, that the aerial vehicle 102 is charged and/or has left the predefined charging location.

Figure 2:
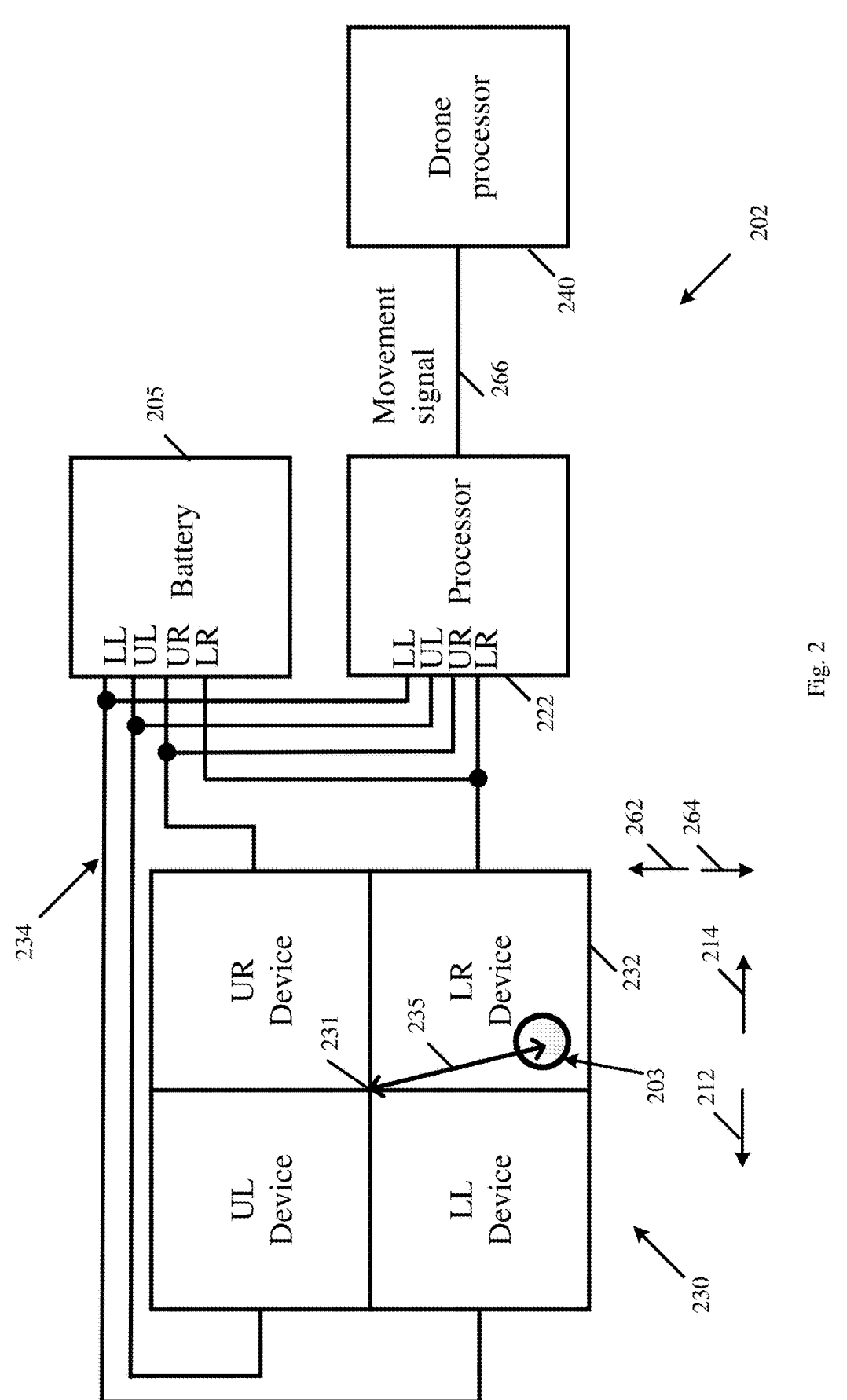
FIG. 2 is a schematic illustration of components of an aerial device, in accordance with some demonstrative aspects.

Reference is made to FIG. 2, which schematically illustrates components of an aerial vehicle 202, in accordance with some demonstrative aspects. For example, aerial vehicle 102 (FIG. 1) may include one or more of the components of aerial vehicle 202, and/or may perform one or more operations and/or functionalities of the components of aerial vehicle 202.

In some demonstrative aspects, as shown in FIG. 2, aerial vehicle 202 may include a controller ("Drone Processor") 240, which may be configured to control movement of the aerial vehicle 202.

In some demonstrative aspects, as shown in FIG. 2, aerial vehicle 202 may include a battery 205.

In some demonstrative aspects, as shown in FIG. 2, aerial vehicle 202 may include a light receiver 230, which may be configured to harvest energy of a light beam 203, for example, to charge the battery 205, e.g., as described below.

In some demonstrative aspects, as shown in FIG. 2, light receiver 230 may include a quadrant light receiver 230 including four photodiodes 232, which may be arranged in a 2×2 matrix, e.g., as a quadrant array.

In other aspects, light receiver 230 may include any other number of photodiodes 232, which may be arranged in any other suitable geometrical arrangement.

In some demonstrative aspects, as shown in FIG. 2, the four photodiodes 232 may include a first photodiode, denoted Upper Left (UL), a second first photodiode, denoted Lower Left (LL), a third photodiode, denoted Upper Right (UR), and/or a fourth photodiode, denoted Lower Right (LR).

In some demonstrative aspects, as shown in FIG. 2, the four photodiodes 232 may generate a plurality of electric currents 234, for example, by harvesting the energy of the light beam 203.

In some demonstrative aspects, as shown in FIG. 2, light receiver 230 may be configured to charge the battery 205, for example, based on the plurality of electric currents 234.

In some demonstrative aspects, as shown in FIG. 2, aerial vehicle 202 may include a processor 222, which may be configured to process photodiode signal information corresponding to the plurality of electric currents 234.

In one example, the photodiode signal information may include a plurality of current magnitudes of the plurality of electric currents 234.

In other aspects, the photodiode signal information may include any other additional or alternative information corresponding to the plurality of electric currents 234.

In some demonstrative aspects, processor 222 may be configured to determine a vehicle-position displacement, e.g., vehicle-position displacement 123 (FIG. 1), for example, to displace the aerial vehicle 202, for example, based on the plurality of electric currents 234, e.g., as described below.

In some demonstrative aspects, the vehicle-position displacement may be configured to adjust a photodiode-beam relative position of the plurality of photodiodes 232 relative to the light beam 203.

In one example, the photodiode-beam relative position of the plurality of photodiodes 232 relative to the light beam 203 may be determined, for example, according to a relative position 235 between a center of the light beam 203 and a center 231 of light receiver 230.

In other aspects, the photodiode-beam relative position may be determined according to any other definition of the relative position of the plurality of photodiodes 232 relative to the light beam 203.

In some demonstrative aspects, processor 222 may be configured to provide to the drone processor 240 movement information (signal) 266, which may be based on the vehicle-position displacement. For example, movement information (signal) 266 may include position displacement information 125 (FIG. 1), e.g., as described above.

In some demonstrative aspects, processor 222 may be configured to determine the vehicle-position displacement, for example, based on a mapping between the plurality of electric currents 234 and a plurality of photodiode positions of the plurality of photodiodes 232 in the 2×2 matrix, e.g., as described below.

In some demonstrative aspects, processor 222 may be configured to determine the vehicle-position displacement, for example, based on a comparison between magnitudes of the plurality of electric currents 234, e.g., as described below.

In some demonstrative aspects, processor 222 may be configured to determine the vehicle-position displacement, for example, based on the arrangement of the plurality of photodiodes 232 in the 2×2 matrix, e.g., as described below.

In some demonstrative aspects, processor 222 may be configured to determine the vehicle-position displacement, for example, based on a distribution of the magnitudes of the plurality of electric currents 234, for example, with respect to the arrangement of the plurality of photodiodes 232 in the 2×2 matrix.

In one example, processor 222 may be configured to determine the vehicle-position displacement to displace the aerial vehicle 202 towards a left direction 212, for example, based on a determination that the distribution of the magnitudes of the plurality of electric currents 234 indicates that the light beam 203 is located left to the center 231 of the light receiver 230.

In another example, processor 222 may be configured to determine the vehicle-position displacement to displace the aerial vehicle 202 towards a right direction 214, for example, based on a determination that the distribution of the magnitudes of the plurality of electric currents 234 indicates that the light beam is located right to the center 231 of the light receiver 230.

In one example, processor 222 may be configured to determine the vehicle-position displacement to displace the aerial vehicle 202 towards an up direction 262, for example, based on a determination that the distribution of the magnitudes of the plurality of electric currents 234 indicates that the light beam 203 is located above the center 231 of the light receiver 230.

In one example, processor 222 may be configured to determine the vehicle-position displacement to displace the aerial vehicle 202 towards a down direction 264, for example, based on a determination that the distribution of the magnitudes of the plurality of electric currents 234 indicates that the light beam 203 is located below the center 231 of the light receiver 230.

In another example, processor 222 may be configured to determine that the aerial vehicle 202 is not to be displaced, for example, based on a determination that the distribution of the magnitudes of the plurality of electric currents 234 includes a substantially equal distribution. For example, the distribution of the magnitudes of the plurality of electric currents 234 may indicate that the light beam substantially equally illuminates the plurality of photodiodes 232, and accordingly, a total current from the plurality of photodiodes 232 may be maximized.

In another example, in some use cases and/or scenarios, processor 222 may be configured to determine that the aerial vehicle 202 is to be displaced, for example, based on the determination that the distribution of the magnitudes of the plurality of electric currents 234 includes a substantially equal distribution.

For example, processor 222 may be configured to determine that the aerial vehicle 202 is to be displaced by a displacement, which may include a vertical displacement and may substantially maintain the equal distribution of the magnitudes of the plurality of electric currents 234.

In one example, processor 222 may be configured to determine that the aerial vehicle 202 is to be displaced by a displacement, which may include a vertical displacement downward and may substantially maintain the equal distribution of the magnitudes of the plurality of electric currents 234, for example, based on a determination that the total current from the plurality of photodiodes 232 is to be increased, e.g., when the total current from the plurality of photodiodes 232 is determined to be less that a target current.

In one example, processor 222 may be configured to determine that the aerial vehicle 202 is to be displaced by a displacement, which may include a vertical displacement upward and may substantially maintain the equal distribution of the magnitudes of the plurality of electric currents 234, for example, based on a determination that the total current from the plurality of photodiodes 232 is to be reduced, e.g., when the total current from the plurality of photodiodes 232 is determined to be higher that a target current.

In some demonstrative aspects, processor 222 may be configured to determine the vehicle-position displacement, for example, based on a comparison between magnitudes of two or more of the plurality of electric currents 234, e.g., as described below.

In some demonstrative aspects, processor 222 may be configured to determine the vehicle-position displacement, for example, based on a difference between a first electric current magnitude mapped to a first photodiode position, e.g., of the first photodiode UL, and a second electric current magnitude mapped to a second photodiode location, e.g., of the second photodiode UR.

In some demonstrative aspects, processor 222 may be configured to determine the vehicle-position displacement, for example, based on the difference between the first and second electric current magnitudes, and, for example, based on a displacement between the first photodiode position and the second photodiode position in the 2×2 matrix, e.g., as described below.

In some demonstrative aspects, processor 222 may be configured to determine a direction of the vehicle-position displacement 223, for example, based on the displacement between the first photodiode position and the second photodiode position in the 2×2 matrix, e.g., as described below.

In some demonstrative aspects, processor 222 may be configured to determine the direction of the vehicle-position displacement, for example, based on sign of the difference between the first electric current magnitude of the first photodiode UL and the second electric current magnitude of the second photodiode UR, e.g., as described below.

In one example, processor 222 may be configured to determine that the vehicle-position displacement is to be in the left direction 212, for example, based on a determination that the sign of the difference between the first electric current magnitude of the first photodiode UL and the second electric current magnitude of the second photodiode UR is positive. For example, processor 222 may determine that the sign of the difference between the first and second electric current magnitudes is positive, for example, when the first electric current magnitude of the first photodiode UL is greater than the second electric current magnitude of the second photodiode UR.

In another one example, processor 222 may be configured to determine that the vehicle-position displacement is to in right direction 214, for example, based on a determination that the sign of the difference between the first electric current magnitude of the first photodiode UL and the second electric current magnitude of the second photodiode UR is negative. For example, processor 222 may determine that the sign of the difference between the first and second electric current magnitudes is negative, for example, when the first electric current magnitude of the first photodiode UL is less than the second electric current magnitude of the second photodiode UR.

In some demonstrative aspects, processor 222 may be configured to determine a magnitude of the vehicle-position displacement, for example, based on the difference between the first electric current magnitude of the first photodiode UL and the second electric current magnitude of the second photodiode UR, e.g., as described below.

For example, processor 222 may be configured to determine a first magnitude of the vehicle-position displacement in the left direction 212, for example, based on a determination of a first difference between the first electric current magnitude of the first photodiode UL and the second electric current magnitude of the second photodiode UR.

For example, processor 222 may be configured to determine a second magnitude of the vehicle-position displacement in the left direction 212, for example, based on a determination of a second difference between the first electric current magnitude of the first photodiode UL and the second electric current magnitude of the second photodiode UR.

For example, processor 222 may be configured to determine the first magnitude of the vehicle-position displacement in the left direction 212, which may be greater, for example, than the second magnitude of the vehicle-position displacement in the left direction 212, for example, in case when the first difference between the first and second electric current magnitudes is greater than the second difference between the first and second electric current magnitudes.

In some demonstrative aspects, processor 222 may be configured to determine the vehicle-position displacement, for example, based on a comparison between a target charging current of the battery 205 and a total current of the plurality of electric currents 234, e.g., as described below.

In some demonstrative aspects, processor 222 may be configured to determine the vehicle-position displacement to adjust the photodiode-beam relative position, for example, such that the light beam 203 may be substantially aligned to the center 231 of light receiver 230.

For example, processor 222 may be configured to determine the vehicle-position displacement to adjust the photodiode-beam relative position such that the position of the light beam 203 may be substantially at the center 231, for example, to equally illuminate the plurality of photodiodes 232.

In some demonstrative aspects, processor 222 may be configured to determine the vehicle-position displacement to substantially align the light beam 203 to the center 231 of light receiver 230, for example, based on a determination that the target charging current includes a maximal current.

In some demonstrative aspects, processor 222 may be configured to determine the vehicle-position displacement, for example, to increase or to reduce the total current of the plurality of electric currents 234, for example, based on a target charging current according to a charging profile to charge the battery 205. For example, the target charging current may be based on an SOC of battery 205, e.g., as described below.

In some demonstrative aspects, processor 222 may be configured to determine the vehicle-position displacement to adjust the relative position 235, for example, such that the light beam 203 may not be at the center 231 of the light receiver 230, for example, based on a determination that the target current is lower than the total current of the plurality of electric currents 234.

For example, the charging profile of battery 205 may define that at a high SoC of the battery 205, e.g., above 90 percent, the target current may be less than the maximal current, e.g., 50 percent below the maximal current, or any other percentage of the maximal current.

Figure 3:
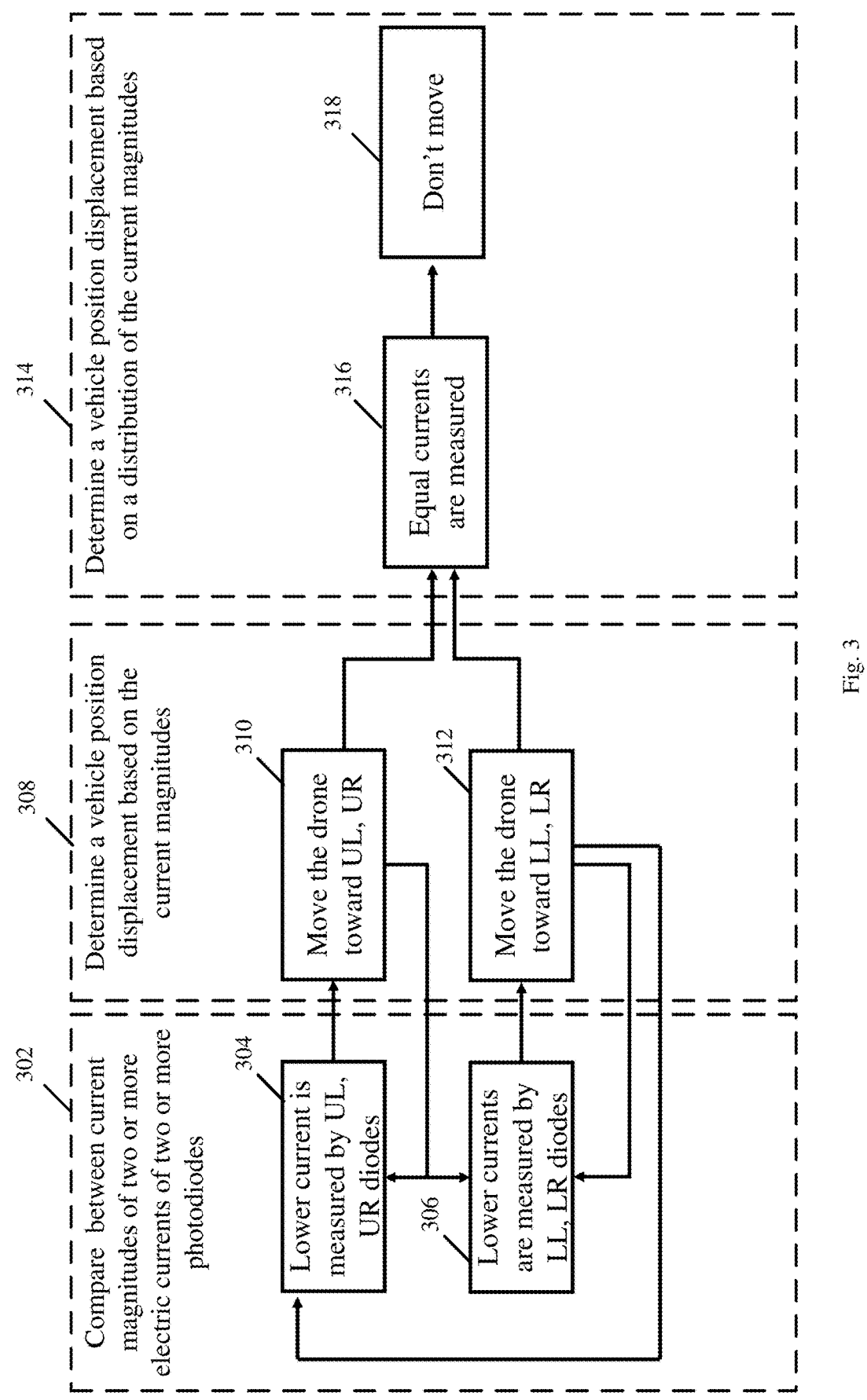
FIG. 3 is a schematic flow-chart illustration of a method of determining a vehicle position displacement to displace an aerial vehicle, in accordance with some demonstrative aspects.

Reference is made to FIG. 3, which schematically illustrates a method of determining a vehicle position displacement to displace an aerial vehicle, in accordance with some demonstrative aspects. For example, one or more of the operations of the method of FIG. 3 may be performed by an aerial vehicle, e.g., aerial vehicle 102 (FIG. 1), and/or aerial vehicle 202 (FIG. 1); and/or a processor, e.g., data processor 120 (FIG. 1), processor 122 (FIG. 11), and/or processor 222 (FIG. 2).

As indicated at block 302, the method may include comparing between current magnitudes of two or more electric currents of two or more photodiodes of the aerial vehicle. For example, processor 222 (FIG. 2) may be configured to compare between current magnitudes of the UL, UR, LR and LL photodiodes, e.g., as described above.

As indicated at block 304, comparing between the current magnitudes of the two or more electric currents of the two or more photodiodes may include determining whether the current magnitudes, e.g., the total current magnitude, of electric current from the UL and UR photodiodes, are lower than the current magnitudes, e.g., the total current magnitude, of electric current from the LL and LR photodiodes. For example, processor 222 (FIG. 2) may be configured to determine whether the total current magnitude of electric current from the UL and UR photodiodes 232 (FIG. 2) is lower than the total current magnitude of electric current from the LL and LR photodiodes 232 (FIG. 2), e.g., as described above.

As indicated at block 306, comparing between the current magnitudes of the two or more electric currents of the two or more photodiodes may include determining whether the current magnitudes, e.g., the total current magnitude, of electric current from the LL and LR photodiodes, are lower than the current magnitudes, e.g., the total current magnitude, of electric current from the UL and UR photodiodes. For example, processor 222 (FIG. 2) may be configured to determine whether the total current magnitude of electric current from the LL and LR photodiodes 232 (FIG. 2) is lower than the total current magnitude of electric current from the UL and UR photodiodes 232 (FIG. 2), e.g., as described above.

As indicated at block 308, the method may include determining a vehicle position displacement to displace the aerial vehicle based on a comparison between the current magnitudes of the two or more electric currents of the two or more photodiodes. For example, processor 222 (FIG. 2) may be configured to determine the vehicle position displacement to displace the aerial vehicle 202 (FIG. 2), for example, based on the comparison between the current magnitudes of the two or more electric currents 234 (FIG. 2) of the two or more photodiodes 232 (FIG. 2), e.g., as described above.

As indicated at block 310, determining the vehicle position displacement to displace the aerial vehicle may include determining the vehicle position displacement to move the aerial vehicle in a direction towards positions of the UL and UR photodiodes, for example, based on a determination that the current magnitudes of electric current from the UL and UR photodiodes are lower than the current magnitudes of electric current from the LL and LL photodiodes. For example, processor 222 (FIG. 2) may be configured to determine the vehicle position displacement to move the aerial vehicle 202 (FIG. 2) in a direction towards positions of the UL and UR photodiodes 232 (FIG. 2), for example, based on a determination that the total current magnitude of electric current from the UL and UR photodiodes 232 (FIG. 2) is lower than the current magnitudes of electric current from the LL and LR photodiodes 232 (FIG. 2), e.g., as described above.

As indicated at block 312, determining the vehicle position displacement to displace the aerial vehicle may include determining the vehicle position displacement to move the aerial vehicle in a direction towards positions of the LL and LR photodiodes based on a determination that the current magnitudes of electric current from the LL and LR photodiodes are lower than the current magnitudes of electric current from the UL and UR photodiodes. For example, processor 222 (FIG. 2) may be configured to determine the vehicle position displacement to move the aerial vehicle 202 (FIG. 2) in a direction towards positions of the LL and LR photodiodes 232 (FIG. 2), for example, based on a determination that the total current magnitudes of electric current from the LL and LR photodiodes 232 (FIG. 2) is lower than the total current magnitudes of electric current from the UL and UR photodiodes 232 (FIG. 2), e.g., as described above.

As indicated at block 314, the method may include determining a vehicle position displacement to displace an aerial vehicle based on a distribution of the current magnitudes of the two or more electric currents of the two or more photodiodes. For example, processor 222 (FIG. 2) may be configured to determine the vehicle position displacement to displace the aerial vehicle 202 (FIG. 2), for example, based the distribution of the current magnitudes of the two or more electric currents 234 (FIG. 2) of the two or more photodiodes 232 (FIG. 2), e.g., as described above.

As indicated at block 316, determining the vehicle position displacement to displace an aerial vehicle based the distribution of the current magnitudes may include determining whether or not the plurality of electric currents of the plurality of photodiodes are equally distributed. For example, processor 222 (FIG. 2) may be configured to determine whether or not the current magnitudes of the plurality of electric currents 234 (FIG. 2) of the plurality of photodiodes 232 (FIG. 2) are equally distributed between the plurality of photodiodes 232 (FIG. 2), e.g., as described above.

As indicated at block 318, determining the vehicle position displacement to displace an aerial vehicle based the distribution of the current magnitudes may include maintaining a position of the aerial vehicle, for example, based on a determination that the plurality of electric currents of the plurality of photodiodes are substantially equally distributed. For example, processor 222 (FIG. 2) may be configured to maintain a position of the aerial vehicle 202 (FIG. 2), for example, based on the determination that the current magnitudes of the plurality of electric currents 234 (FIG. 2) of the plurality of photodiodes 232 (FIG. 2) are substantially equally distributed between the plurality of photodiodes 232 (FIG. 2). For example, the current magnitudes of the plurality of electric currents 234 (FIG. 2) of the plurality of photodiodes 232 (FIG. 2) may be equally distributed between the plurality of photodiodes 232 (FIG. 2), for example, when the beam 203 (FIG. 2) is substantially at the center 231 (FIG. 2) of the light receiver 230 (FIG. 2), e.g., as described above.

For example, processor 222 (FIG. 2) may be configured to maintain the position of the aerial vehicle 202 (FIG. 2), for example, based on the determination that the current magnitudes of the plurality of electric currents 234 (FIG. 2) of the plurality of photodiodes 232 (FIG. 2) are substantially equally distributed between the plurality of photodiodes 232 (FIG. 2), and based, for example, on a determination that the target charging current of the battery 205 (FIG. 2) is the maximum current, e.g., as described above.

Figure 4:
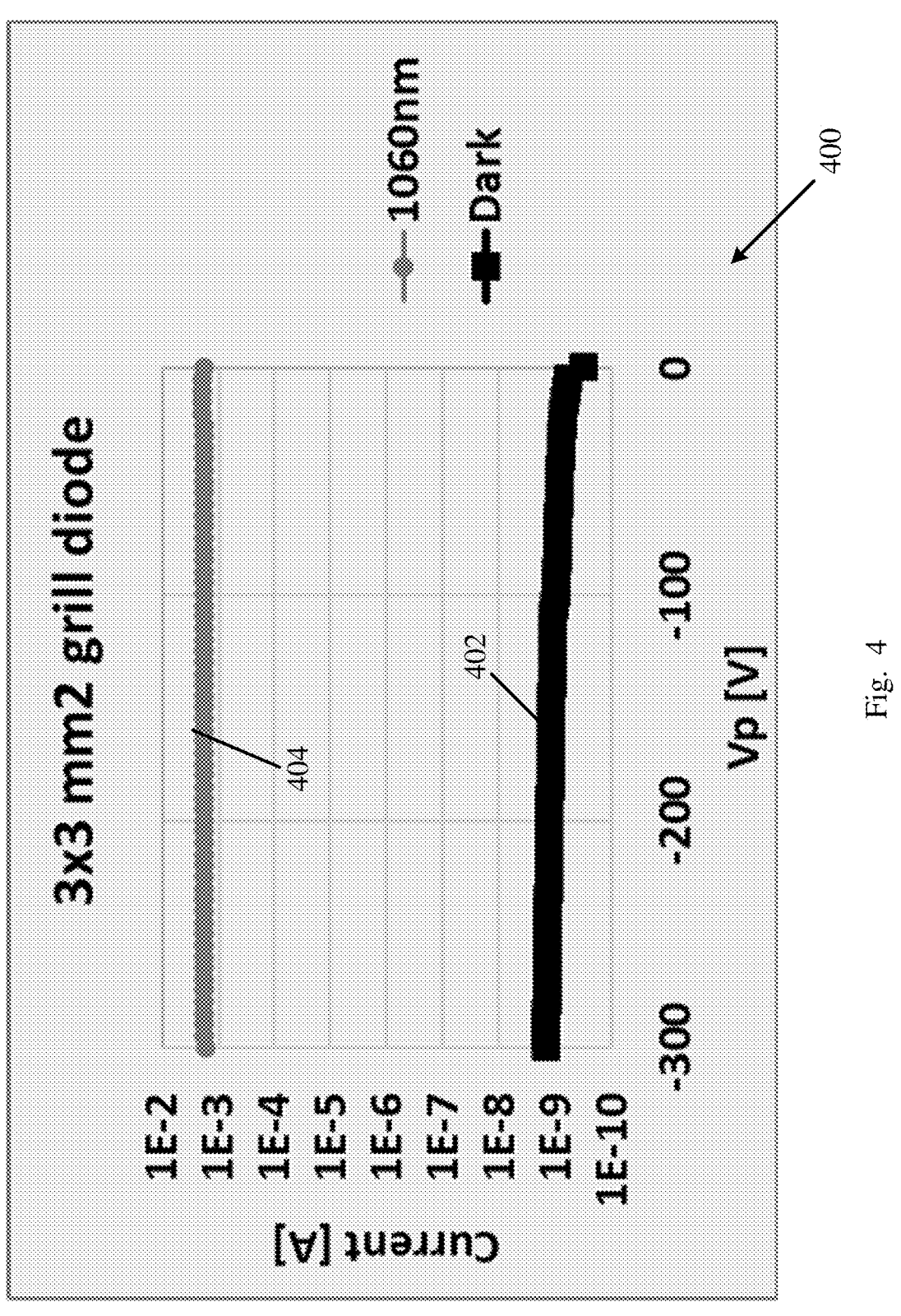
FIG. 4 is a schematic illustration of a graph depicting output currents of a photodiode, in accordance with some demonstrative aspects.

Reference is made to FIG. 4, which schematically illustrates a graph 400 depicting output currents of a photodiode, in accordance with some demonstrative aspects.

For example, graph 400 may represent output currents of a photodiode 232 (FIG. 2).

In some demonstrative aspects, as shown in FIG. 4, a first curve 402 may represent a first output current of the photodiode, which may be generated, for example, when the photodiode is not subject to emission from a light beam, e.g., in a dark scenario.

In some demonstrative aspects, as shown in FIG. 4, a second curve 404 may represent a second output current of the photodiode, for example, which may be generated based on a light beam, e.g., light beam 103 (FIG. 1), having a wavelength of 1.06 um.

In some demonstrative aspects, as shown in FIG. 4, the photodiode subject to the light beam having the wavelength of 1.06 micrometer may provide an output current in the order of milliwatts.

Figure 5:
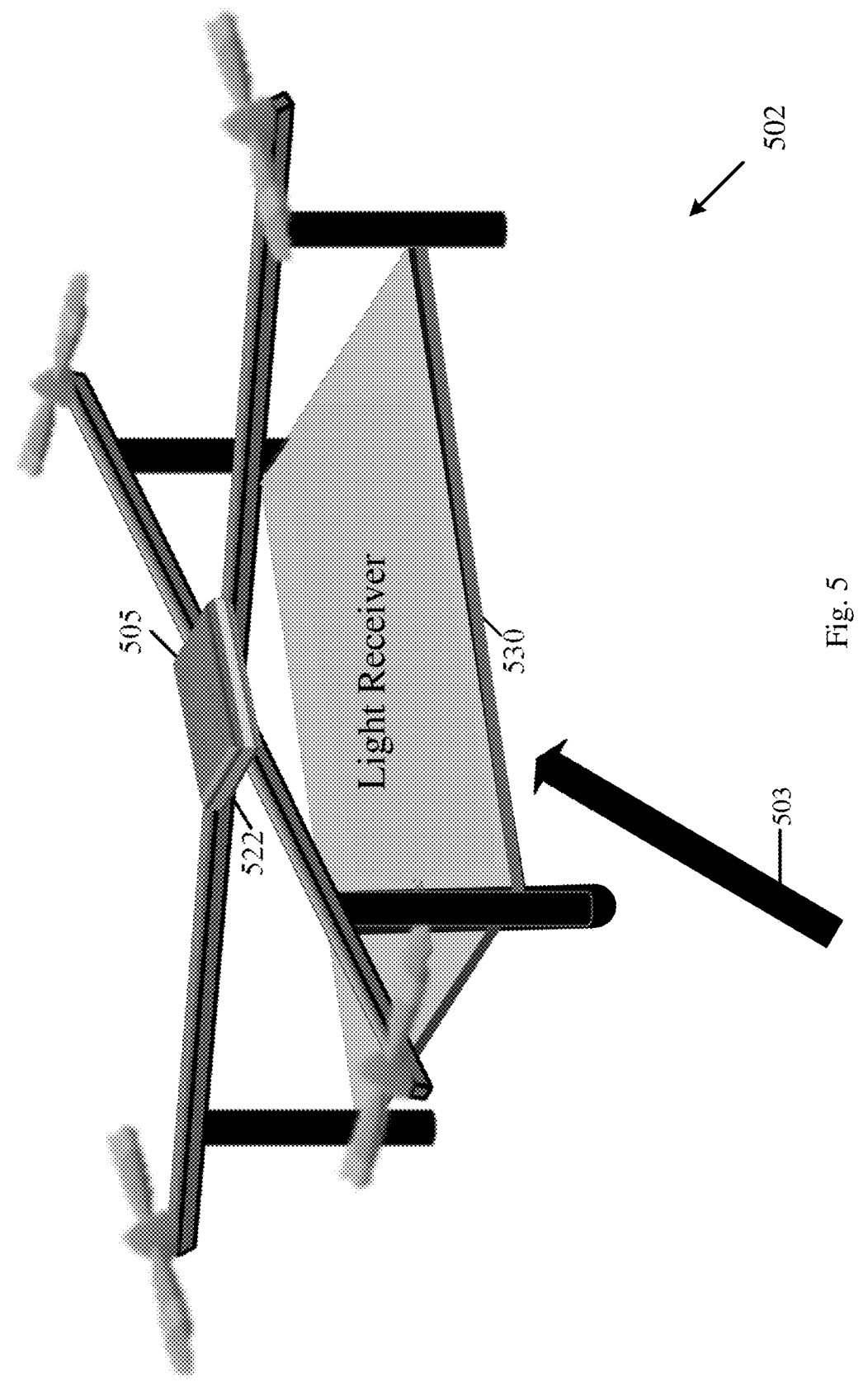
FIG. 5 is a schematic illustration of an aerial device, in accordance with some demonstrative aspects.

Reference is made to FIG. 5, which schematically illustrates an aerial vehicle 502, in accordance with some demonstrative aspects. For example, aerial vehicle 102 (FIG. 1) may include one or more elements of aerial vehicle 502, and/or may perform one or more operations of aerial vehicle 502.

In some demonstrative aspects, as shown in FIG. 5, aerial vehicle 502 may include a quadcopter, or a drone.

In some demonstrative aspects, aerial vehicle 502 may include a controller ("Drone Processor"), which may be configured to control movement of the aerial vehicle 502.

In some demonstrative aspects, as shown in FIG. 5, aerial vehicle 502 may include a battery 505.

In some demonstrative aspects, (FIG. 1) aerial vehicle 502 may include a light receiver 530, which may be configured to harvest energy of a light beam 503, for example, to charge the battery 505.

In some demonstrative aspects, as shown in FIG. 5, aerial vehicle 502 may include a processor 522. For example, processor 522 may include one or more elements of processor 120 (FIG. 1) and/or may perform one or more operations of processor 120 (FIG. 1).

In some demonstrative aspects, processor 522 may be configured to determine a vehicle-position displacement, for example, to displace the aerial vehicle 502, for example, based on a plurality of electric currents from light receiver 530, e.g., as described above.

In some demonstrative aspects, processor 522 may be configured to provide position displacement information, which may be configured to request, instruct, trigger, cause, and/or control the drone processor to displace the aerial vehicle 502 according to the vehicle-position displacement, e.g., as described above.

Reference is made to FIG. 6, which schematically illustrates a method of charging a battery of an aerial vehicle, in accordance with some demonstrative aspects. For example, one or more of the operations of the method of FIG. 6 may be performed by an aerial vehicle, e.g., aerial vehicle 102 (FIG. 1), aerial vehicle 202 (FIG. 2), and/or aerial vehicle 502 (FIG. 5); and/or a processor, e.g., data processor 120 (FIG. 1), processor 122 (FIG. 11), and/or processor 222 (FIG. 2).

As indicated at block 602, the method may include processing photodiode signal information, which corresponds to a plurality of photodiodes of an aerial vehicle, to identify a plurality of electric currents, which are generated by the plurality of photodiodes based on energy of a light beam to charge a battery of the aerial vehicle. For example, processor 122 (FIG. 1) may be configured to process the photodiode signal information 133 (FIG. 1), which may correspond to the plurality of photodiodes 132 (FIG. 1) of aerial vehicle 102 (FIG. 1), for example, to identify the plurality of electric currents 134 (FIG. 1), which may be generated by the plurality of photodiodes 132 (FIG. 1), for example, based on the energy of the light beam 103 (FIG. 1) to charge the battery 105 (FIG. 1) of the aerial vehicle 102 (FIG. 2), e.g., as described above.

As indicated at block 604, the method may include determining a vehicle-position displacement to displace the aerial vehicle, for example, based on the plurality of electric currents. For example, the vehicle-position displacement may be configured to adjust a photodiode-beam relative position of the plurality of photodiodes relative to the light beam. For example, processor 122 (FIG. 1) may be configured to determine the vehicle-position displacement 123 (FIG. 1) to displace the aerial vehicle 102 (FIG. 1), for example, based on the plurality of electric currents 134 (FIG. 1), e.g., as described above.

As indicated at block 606, the method may include providing position displacement information based on the vehicle-position displacement. For example, processor 122 (FIG. 1) may be configured to cause output 126 (FIG. 1) to provide the position displacement information 125 (FIG. 1), e.g., to controller 140 (FIG. 1), for example, based on the vehicle-position displacement 123 (FIG. 1), e.g., as described above.

Figure 7:
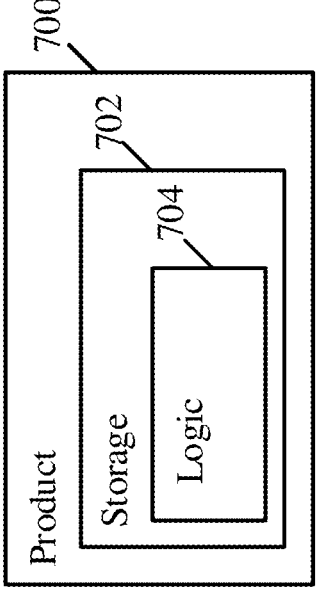
FIG. 7 is a schematic illustration of a product of manufacture, in accordance with some demonstrative aspects.

Reference is made to FIG. 7, which schematically illustrates a product of manufacture 700, in accordance with some demonstrative aspects. Product 700 may include one or more tangible computer-readable ("machine-readable")

non-transitory storage media 702, which may include computer-executable instructions, e.g., implemented by logic 704, operable to, when executed by at least one computer processor, enable the at least one computer processor to implement one or more operations and/or functionalities described with reference to any of the FIGS. 1-6, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 700 and/or machine-readable storage media 702 may include one or more types of computer-readable storage media capable of storing data, including volatile memory, non-volatile memory, removable or non-removable memory, erasable or non-erasable memory, writeable or re-writeable memory, and the like. For example, machine-readable storage media 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EE-PROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio, or network connection.

In some demonstrative aspects, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner, or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising a processor configured to process photodiode signal information, which corresponds to a plurality of photodiodes of an aerial vehicle, to identify a plurality of electric currents, which are generated by the plurality of photodiodes based on energy of a light beam to charge a battery of the aerial vehicle; and determine a vehicle-position displacement to displace the aerial vehicle based on the plurality of electric currents, the vehicle-position displacement to adjust a photodiode-beam relative position of the plurality of photodiodes relative to the light beam; and an output to provide position displacement information based on the vehicle-position displacement.

Example 2 includes the subject matter of Example 1, and optionally, wherein the processor is configured to determine the vehicle-position displacement based on a mapping between the plurality of electric currents and a plurality of photodiode positions of the plurality of photodiodes.

Example 3 includes the subject matter of Example 2, and optionally, wherein the processor is configured to determine the vehicle-position displacement based on a difference between a first electric current magnitude mapped to a first photodiode position and a second electric current magnitude mapped to a second photodiode location, and based on a displacement between the first photodiode position and the second photodiode position.

Example 4 includes the subject matter of Example 3, and optionally, wherein the processor is configured to determine a magnitude of the vehicle-position displacement based on the difference between the first electric current magnitude and the second electric current magnitude.

Example 5 includes the subject matter of Example 3 or 4, and optionally, wherein the processor is configured to determine a direction of the vehicle-position displacement based on the displacement between the first photodiode position and the second photodiode position.

Example 6 includes the subject matter of any one of Examples 3-5, and optionally, wherein the processor is configured to determine a direction of the vehicle-position displacement based on sign of the difference between the first electric current magnitude and the second electric current magnitude.

Example 7 includes the subject matter of any one of Examples 3-6, and optionally, wherein the processor is configured to determine a first vehicle-position displacement based on a first difference between the first electric current magnitude and the second electric current magnitude, and to determine a second vehicle-position displacement based on a second difference between the first electric current magnitude and the second electric current magnitude, wherein the first difference is different from the second difference, the second vehicle-position displacement is different from the first vehicle-position displacement.

Example 8 includes the subject matter of any one of Examples 2-7, and optionally, wherein the processor is configured to determine a photodiode-beam relative position adjustment to adjust the photodiode-beam relative position based on the mapping between the plurality of electric currents and the plurality of photodiode positions, and to determine the vehicle-position displacement based on the photodiode-beam relative position adjustment.

Example 9 includes the subject matter of any one of Examples 2-8, and optionally, wherein the processor is configured to determine the vehicle-position displacement based on a geometrical arrangement of the plurality of photodiode positions.

Example 10 includes the subject matter of any one of Examples 2-9, and optionally, wherein the processor is configured to determine the vehicle-position displacement based on a comparison between magnitudes of two or more of the plurality of electric currents.

Example 11 includes the subject matter of any one of Examples 2-10, and optionally, wherein the processor is configured to determine the vehicle-position displacement based on a distribution of magnitudes of the plurality of electric currents.

Example 12 includes the subject matter of any one of Examples 1-11, and optionally, wherein the processor is configured to determine a first vehicle-position displacement based on a first plurality of electric currents, and to determine a second vehicle-position displacement based on a second plurality of electric currents, wherein the second vehicle-position displacement is different from the first vehicle-position displacement, and the second plurality of electric currents is different from the first plurality of electric currents.

Example 13 includes the subject matter of any one of Examples 1-12, and optionally, wherein the processor is configured to determine the vehicle-position displacement based on a comparison between a total current of the plurality of electric currents and a target charging current of the battery.

Example 14 includes the subject matter of Example 13, and optionally, wherein the processor is configured to determine the vehicle-position displacement to increase the total current of the plurality of electric currents based on a determination that the total current is lower than the target charging current.

Example 15 includes the subject matter of Example 13 or 14, and optionally, wherein the processor is configured to determine the vehicle-position displacement to reduce the total current of the plurality of electric currents based on a determination that the total current is higher than the target charging current.

Example 16 includes the subject matter of any one of Examples 13-15, and optionally, wherein the processor is configured to determine a first vehicle-position displacement based on a first target charging current, and to determine a second vehicle-position displacement based on a second target charging current, wherein the second vehicle-position displacement is different from the first vehicle-position displacement, and the second target charging current is different from the first target charging current.

Example 17 includes the subject matter of any one of Example 13-16, and optionally, wherein the processor is configured to determine the target charging current according to a charging profile to charge the battery based on a State Of Charge (SOC) of the battery.

Example 18 includes the subject matter of any one of Example 13-16, and optionally, wherein the target charging current comprises a maximal current.

Example 19 includes the subject matter of any one of Example 13-18, and optionally, wherein the processor is configured to, based on a determination that the target charging current comprises a maximal current, determine the vehicle-position displacement to adjust the photodiode-beam relative position such that the light beam substantially equally illuminates the plurality of photodiodes, based on a determination that the target charging current comprises a maximal current.

Example 20 includes the subject matter of any one of Examples 1-19, and optionally, wherein the photodiode signal information comprises a plurality of current magnitudes of the plurality of electric currents.

Example 21 includes the subject matter of any one of Examples 1-20, and optionally, wherein the position displacement information comprises the vehicle-position displacement.

Example 22 includes the subject matter of any one of Examples 1-21, and optionally, wherein the plurality of photodiodes comprises at least three photodiodes.

Example 23 includes the subject matter of any one of Examples 1-22, and optionally, wherein the plurality of photodiodes comprises at least four photodiodes.

Example 24 includes the subject matter of any one of Examples 1-23, and optionally, comprising the plurality of photodiodes.

Example 25 includes the subject matter of Example 24, and optionally, comprising a light receiver Silicon Integrated Circuit (SIC) configured to harvest the energy of the light beam, wherein the light receiver SIC comprises the plurality of photodiodes.

Example 26 includes the subject matter of Example 25, and optionally, wherein a width of the light receiver SIC is based on a two-sigma intensity distribution of the light beam.

Example 27 includes the subject matter of Example 25 or 26, and optionally, wherein the light receiver SIC comprises a quadrant light receiver SIC comprising four photodiodes arranged in a 2×2 matrix.

Example 28 includes the subject matter of any one of Examples 24-27, and optionally, comprising a radiator attached to the plurality of photodiodes.

Example 29 includes the subject matter of any one of Examples 24-28, and optionally, wherein at least one photodiode of the plurality of photodiodes is configured to provide a Quantum Efficiency (QE) of at least 45 percent.

Example 30 includes the subject matter of any one of Examples 24-29, and optionally, wherein at least one photodiode of the plurality of photodiodes is configured to provide a Quantum Efficiency (QE) of at least 70 percent.

Example 31 includes the subject matter of any one of Examples 24-30, and optionally, wherein at least one photodiode of the plurality of photodiodes comprises a P-type plus (P+)–N-type minus (N–) (P+–N–) photodiode, or an N-type plus (N+) P-type minus (P–) (N+–P–) photodiode.

Example 32 includes the subject matter of any one of Examples 24-31, and optionally, wherein at least one photodiode of the plurality of photodiodes comprises a black-silicon patterned surface photodiode.

Example 33 includes the subject matter of any one of Examples 24-32, and optionally, wherein at least one photodiode of the plurality of photo diodes is coated with an Anti-Reflective Coating (ARC).

Example 34 includes the subject matter of any one of Examples 24-33, and optionally, wherein at least one photodiode of the plurality of photo diodes comprises a Float Zone Silicon photodiode.

Example 35 includes the subject matter of any one of Examples 1-34, and optionally, wherein the light beam comprises a Neodymium-Doped Yttrium Aluminum Garnet (ND:YAG) light beam.

Example 36 includes the subject matter of any one of Examples 1-35, and optionally, wherein a wavelength of the light beam is between 0.9 and 1.1 micrometer.

Example 37 includes the subject matter of any one of Examples 1-36, and optionally, wherein the light beam comprises a Near Infra-Red (NIR) light beam.

Example 38 includes the subject matter of any one of Examples 1-37, and optionally, comprising the aerial vehicle, the aerial vehicle comprising the battery, a movement controller, and a light receiver comprising the plurality of diodes, wherein the movement controller is configured to control movement of the aerial vehicle based on the position displacement information.

Example 39 includes the subject matter of any one of Examples 1-38, and optionally, wherein the aerial vehicle comprises a drone, a quadcopter, or an Unmanned Aerial Vehicle (UAV).

Example 40 includes an aerial vehicle comprising a battery; one or more flight controllers to control movement of the aerial vehicle; a light receiver comprising a plurality of photodiodes to generate a plurality of electric currents based on energy of a light beam to charge the battery; and a processor configured to process photodiode signal information, which corresponds to the plurality of photodiodes, to identify the plurality of electric currents, which are generated by the plurality of photodiodes based on the energy of the light beam; determine a vehicle-position displacement to displace the aerial vehicle based on the plurality of electric currents, the vehicle-position displacement to adjust a photodiode-beam relative position of the plurality of photodiodes relative to the light beam; and provide position displacement information based on the vehicle-position displacement, the position displacement information to control displacement of the aerial vehicle by the one or more flight controllers.

Example 41 includes the aerial vehicle of Example 40, and optionally, including the subject matter of any of examples 1-39.

Example 42 includes a product comprising one or more tangible computer-readable non-transitory storage media comprising instructions operable to, when executed by at least one processor of an aerial vehicle, enable the at least one processor to process photodiode signal information, which corresponds to a plurality of photodiodes of the aerial vehicle, to identify a plurality of electric currents, which are generated by the plurality of photodiodes based on energy of a light beam to charge a battery of the aerial vehicle; determine a vehicle-position displacement to displace the aerial vehicle based on the plurality of electric currents, the vehicle-position displacement to adjust a photodiode-beam relative position of the plurality of photodiodes relative to the light beam; and provide position displacement information based on the vehicle-position displacement.

Example 43 includes the product of Example 42, and optionally, including the subject matter of any of examples 1-39.

Example 44 includes a method to be performed at an aerial vehicle, the method comprising processing photodiode signal information, which corresponds to a plurality of photodiodes of the aerial vehicle, to identify a plurality of electric currents, which are generated by the plurality of photodiodes based on energy of a light beam to charge a battery of the aerial vehicle; determining a vehicle-position displacement to displace the aerial vehicle based on the plurality of electric currents, the vehicle-position displacement to adjust a photodiode-beam relative position of the plurality of photodiodes relative to the light beam; and providing position displacement information to control displacement of the aerial vehicle based on the vehicle-position displacement.

Example 45 includes the method of Example 44, and optionally, including the subject matter of any of examples 1-39.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
  a processor configured to:
    process photodiode signal information, which corresponds to a plurality of photodiodes of an aerial vehicle, to identify a plurality of electric currents, which are generated by the plurality of photodiodes based on energy of a light beam to charge a battery of the aerial vehicle; and
    determine a vehicle-position displacement to displace the aerial vehicle based on the plurality of electric currents, the vehicle-position displacement to adjust a photodiode-beam relative position of the plurality of photodiodes relative to the light beam; and
  an output to provide position displacement information based on the vehicle-position displacement.

2. The apparatus of claim 1, wherein the processor is configured to determine the vehicle-position displacement based on a mapping between the plurality of electric currents and a plurality of photodiode positions of the plurality of photodiodes.

3. The apparatus of claim 2, wherein the processor is configured to determine the vehicle-position displacement based on a difference between a first electric current magnitude mapped to a first photodiode position and a second electric current magnitude mapped to a second photodiode location, and based on a displacement between the first photodiode position and the second photodiode position.

4. The apparatus of claim 3, wherein the processor is configured to determine a magnitude of the vehicle-position displacement based on the difference between the first electric current magnitude and the second electric current magnitude.

5. The apparatus of claim 3, wherein the processor is configured to determine a direction of the vehicle-position displacement based on the displacement between the first photodiode position and the second photodiode position.

6. The apparatus of claim 3, wherein the processor is configured to determine a direction of the vehicle-position displacement based on a sign of the difference between the first electric current magnitude and the second electric current magnitude.

7. The apparatus of claim 3, wherein the processor is configured to determine a first vehicle-position displacement based on a first difference between the first electric current magnitude and the second electric current magnitude, and to determine a second vehicle-position displacement based on a second difference between the first electric current magnitude and the second electric current magnitude, wherein the first difference is different from the second difference, the second vehicle-position displacement is different from the first vehicle-position displacement.

8. The apparatus of claim 2, wherein the processor is configured to determine a photodiode-beam relative position adjustment to adjust the photodiode-beam relative position based on the mapping between the plurality of electric currents and the plurality of photodiode positions, and to determine the vehicle-position displacement based on the photodiode-beam relative position adjustment.

9. The apparatus of claim 2, wherein the processor is configured to determine the vehicle-position displacement based on a geometrical arrangement of the plurality of photodiode positions.

10. The apparatus of claim 2, wherein the processor is configured to determine the vehicle-position displacement based on a comparison between magnitudes of two or more of the plurality of electric currents.

11. The apparatus of claim 2, wherein the processor is configured to determine the vehicle-position displacement based on a distribution of magnitudes of the plurality of electric currents.

12. The apparatus of claim 1, wherein the processor is configured to determine a first vehicle-position displacement based on a first plurality of electric currents, and to determine a second vehicle-position displacement based on a second plurality of electric currents, wherein the second vehicle-position displacement is different from the first vehicle-position displacement, and the second plurality of electric currents is different from the first plurality of electric currents.

13. The apparatus of claim 1, wherein the processor is configured to determine the vehicle-position displacement based on a comparison between a total current of the plurality of electric currents and a target charging current of the battery.

14. The apparatus of claim 13, wherein the processor is configured to determine the vehicle-position displacement to increase the total current of the plurality of electric currents based on a determination that the total current is lower than the target charging current.

15. The apparatus of claim 13, wherein the processor is configured to determine the vehicle-position displacement to reduce the total current of the plurality of electric currents based on a determination that the total current is higher than the target charging current.

16. The apparatus of claim 13, wherein the processor is configured to determine the target charging current according to a charging profile to charge the battery based on a State Of Charge (SOC) of the battery.

17. The apparatus of claim 13, wherein the processor is configured to, based on a determination that the target charging current comprises a maximal current, determine the vehicle-position displacement to adjust the photodiode-beam relative position such that the light beam substantially equally illuminates the plurality of photodiodes.

18. The apparatus of claim 1, wherein the plurality of photodiodes comprises at least three photodiodes.

19. The apparatus of claim 1 comprising the plurality of photodiodes.

20. The apparatus of claim 19 comprising a light receiver Silicon Integrated Circuit (SIC) configured to harvest the energy of the light beam, wherein the light receiver SIC comprises the plurality of photodiodes.

21. The apparatus of claim 19, wherein at least one photodiode of the plurality of photodiodes is configured to provide a Quantum Efficiency (QE) of at least 45 percent.

22. An aerial vehicle comprising:
   a battery;
   one or more flight controllers to control movement of the aerial vehicle;
   a light receiver comprising a plurality of photodiodes to generate a plurality of electric currents based on energy of a light beam to charge the battery; and
   a processor configured to:
      process photodiode signal information, which corresponds to the plurality of photodiodes, to identify the plurality of electric currents, which are generated by the plurality of photodiodes based on the energy of the light beam;
      determine a vehicle-position displacement to displace the aerial vehicle based on the plurality of electric currents, the vehicle-position displacement to adjust a photodiode-beam relative position of the plurality of photodiodes relative to the light beam; and
      provide position displacement information based on the vehicle-position displacement, the position displacement information to control displacement of the aerial vehicle by the one or more flight controllers.

23. The aerial vehicle of claim 22 comprising a drone, a quadcopter, or an Unmanned Aerial Vehicle (UAV).

24. A product comprising one or more tangible computer-readable non-transitory storage media comprising instructions operable to, when executed by at least one processor of an aerial vehicle, enable the at least one processor to:
   process photodiode signal information, which corresponds to a plurality of photodiodes of the aerial vehicle, to identify a plurality of electric currents, which are generated by the plurality of photodiodes based on energy of a light beam to charge a battery of the aerial vehicle;
   determine a vehicle-position displacement to displace the aerial vehicle based on the plurality of electric currents, the vehicle-position displacement to adjust a photodiode-beam relative position of the plurality of photodiodes relative to the light beam; and
   provide position displacement information based on the vehicle-position displacement.

25. The product of claim 24, wherein the instructions, when executed, cause the processor to determine the vehicle-position displacement based on a mapping between the plurality of electric currents and a plurality of photodiode positions of the plurality of photodiodes.

* * * * *